United States Patent
Ye et al.

(10) Patent No.: US 12,477,518 B2
(45) Date of Patent: Nov. 18, 2025

(54) PARTIAL SENSING FOR RESOURCE SELECTION, REEVALUATION, AND PREEMPTION

(71) Applicant: Apple, Inc., Cupertino, CA (US)

(72) Inventors: Chunxuan Ye, San Diego, CA (US); Chunhai Yao, Beijing (CN); Dawei Zhang, Saratoga, CA (US); Haijing Hu, Los Gatos, CA (US); Haitong Sun, Cupertino, CA (US); Hong He, Cupertino, CA (US); Huaning Niu, Cupertino, CA (US); Jie Cui, San Jose, CA (US); Oghenekome Oteri, Cupertino, CA (US); Seyed Ali Akbar Fakoorian, Cupertino, CA (US); Sigen Ye, Whitehouse Station, NJ (US); Wei Zeng, Saratoga, CA (US); Weidong Yang, Cupertino, CA (US); Yuqin Chen, Beijing (CN); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 705 days.

(21) Appl. No.: 17/442,486

(22) PCT Filed: Apr. 5, 2021

(86) PCT No.: PCT/CN2021/085506
§ 371 (c)(1),
(2) Date: Sep. 23, 2021

(87) PCT Pub. No.: WO2022/213232
PCT Pub. Date: Oct. 13, 2022

(65) Prior Publication Data
US 2023/0337187 A1 Oct. 19, 2023

(51) Int. Cl.
*H04W 72/02* (2009.01)
*H04W 72/25* (2023.01)

(52) U.S. Cl.
CPC .......... *H04W 72/02* (2013.01); *H04W 72/25* (2023.01)

(58) Field of Classification Search
CPC .............................. H04W 72/02; H04W 72/25
See application file for complete search history.

(56) References Cited

U.S. PATENT DOCUMENTS

| | | | |
|---|---|---|---|
| 11,924,676 B2 * | 3/2024 | Shilov | H04W 72/02 |
| 12,232,113 B2 | 2/2025 | Ye et al. | |

(Continued)

FOREIGN PATENT DOCUMENTS

| | | |
|---|---|---|
| CN | 109804682 | 5/2019 |
| CN | 111886916 | 11/2020 |
| CN | 112312526 | 2/2021 |

OTHER PUBLICATIONS

3rd Generation Partnership Project; Technical Specification Group Radio Access Network; NR; Physical layer procedures for control (Release 16), 3GPP TS 38.213 V16.2.0, 5G, Jun. 2020, 176 pages.

(Continued)

*Primary Examiner* — Yemane Mesfin
*Assistant Examiner* — Jia Hao Deng
(74) *Attorney, Agent, or Firm* — Kilpatrick Townsend & Stockton LLP

(57) ABSTRACT

The present application relates to devices and components including apparatus, systems, and methods for partial sensing for resource selection, reevaluation, and preemption. In some embodiments: a UE receives configuration information for a resource pool; determines a type of traffic to be transmitted by the UE, the type to include aperiodic traffic or periodic traffic; determines, based on the configuration infor- (Continued)

mation and traffic type, first and second values to define a window for contiguous partial sensing; and performs contiguous partial sensing within the window.

18 Claims, 27 Drawing Sheets

(56) References Cited

U.S. PATENT DOCUMENTS

| | | | |
|---|---|---|---|
| 2021/0007096 A1 | 1/2021 | Huang et al. | |
| 2021/0314821 A1* | 10/2021 | Huang | H04L 5/1438 |
| 2021/0368479 A1 | 11/2021 | Yu et al. | |
| 2021/0385696 A1 | 12/2021 | Yang et al. | |
| 2022/0046620 A1 | 2/2022 | Chunxuan et al. | |
| 2022/0232528 A1 | 7/2022 | Sartori et al. | |
| 2023/0050353 A1 | 2/2023 | Miao et al. | |
| 2023/0063472 A1 | 3/2023 | Freda et al. | |
| 2023/0084593 A1* | 3/2023 | Hoang | H04W 52/0225 370/311 |
| 2023/0087401 A1* | 3/2023 | Shin | H04W 4/46 370/329 |
| 2023/0141380 A1 | 5/2023 | Yu et al. | |

OTHER PUBLICATIONS

3rd Generation Partnership Project; Technical Specification Group Radio Access Network; NR; Physical layer procedures for data (Release 16), 3GPP TS 38.214 V16.2.0, 5G, Jun. 2020, 164 pages.
3rd Generation Partnership Project; Technical Specification Group Radio Access Network; NR; Radio Resource Control (RRC) protocol specification (Release 16), 3GPP TS 38.331 V16.1.0, 5G, Jul. 2020, 906 pages.
Revised SID: Study on NR V2X, LG Electronics, 3GPP TSG RAN Meeting #81, RP-182111 (revision of RP-182080), Sep. 2018, 6 pages.
Revised SID: Study on NR V2X, LG Electronics, 3GPP TSG RAN Meeting #82, RP-182491 (revision of RP-182080), Dec. 2018, 6 pages.
New WID on 5G V2X with NR sidelink, LG Electronics, 3GPP TSG RAN Meeting #83, RP-190766, Mar. 2019, 8 pages.
Revised WID on 5G V2X with NR sidelink, LG Electronics, 3GPP TSG RAN Meeting #84, RP-190984 (revision of RP-190766), Jun. 2019, 8 pages.
Revised WID on 5G V2X with NR sidelink, LG Electronics, 3GPP TSG RAN Meeting #85, RP-191723 (revision of RP-190984), Sep. 2019, 8 pages.
3rd Generation Partnership Project; Technical Specification Group Services and System Aspects; Study on enhancement of 3GPP Support for 5G V2X Services (Release 16), 3GPP TR 22.886 V16.2.0, 5G, Dec. 2018, 75 pages.
3rd Generation Partnership Project; Technical Specification Group Services and System Aspects; Enhancement of 3GPP support for V2X scenarios; Stage 1 (Release 16), 3GPP TS 22.186 V16.2.0, 5G, Jun. 2019, 18 pages.
U.S. Appl. No. 17/364,674, Non-Final Office Action, Dec. 7, 2023, 17 pages.
FL Summary for AI 8.11.1.1—Resource Allocation for Power Saving, OPPO, R1-2101412, 3GPP TSG RAN WG1, Feb. 5, 2021, 13 pages.
International Patent Application No. PCT/CN2021/085506, International Search Report and Written Opinion, Mailed on Jan. 12, 2022, 13 pages.
3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.4.0, Mar. 2021, 1087 pages.
3rd Generation Partnership Project; Technical Specification Group Radio Access Network; NR; Physical layer procedures for control (Release 16), 3GPP TS 38.213 V16.5.0, Mar. 2021, 183 pages.
3rd Generation Partnership Project; Technical Specification Group Radio Access Network; NR; Physical layer procedures for data (Release 16), 3GPP TS 38.214 V16.5.0, Mar. 2021, 171 pages.
3rd Generation Partnership Project; Technical Specification Group Radio Access Network; NR; Medium Access Control (MAC) protocol specification (Release 16), 3GPP TS 38.321 V16.4.0, Mar. 2021, 157 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
International Patent Application No. PCT/CN2021/085506, International Preliminary Report on Patentability, Oct. 19, 2023, 7 pages.
Resource Allocation Mechanisms for Power Saving, Ericsson, 3GPP TSG-RAN WG1 Meeting #104-e, R1-2100687, Jan. 26, 2021, 16 pages.
European Patent Application No. 21935472.7, Extended European Search Report, Jun. 4, 2024, 9 pages.
European Patent Application No. 21935472.7, Partial Supplementary European Search Report, Mar. 11, 2024, 11 pages.
U.S. Appl. No. 18/525,755 , "Non-Final Office Action", Nov. 14, 2024, 11 pages.

* cited by examiner

PARTIAL SENSING FOR RESOURCE SELECTION, REEVALUATION, AND PREEMPTION

CROSS-REFERENCE TO RELATED APPLICATIONS

This application is a U.S. National Phase of PCT/CN2021/085506 filed Apr. 5, 2021, the disclosure of which is herein incorporated by reference in its entirety for all purposes.

BACKGROUND

Third Generation Partnership Project (3GPP) provides mechanisms for two or more user equipments (UEs) to communicate with one another over sidelink interfaces. Further study on enhancing resource allocation to facilitate sidelink communications is needed.

DETAILED DESCRIPTION

Figure 1:
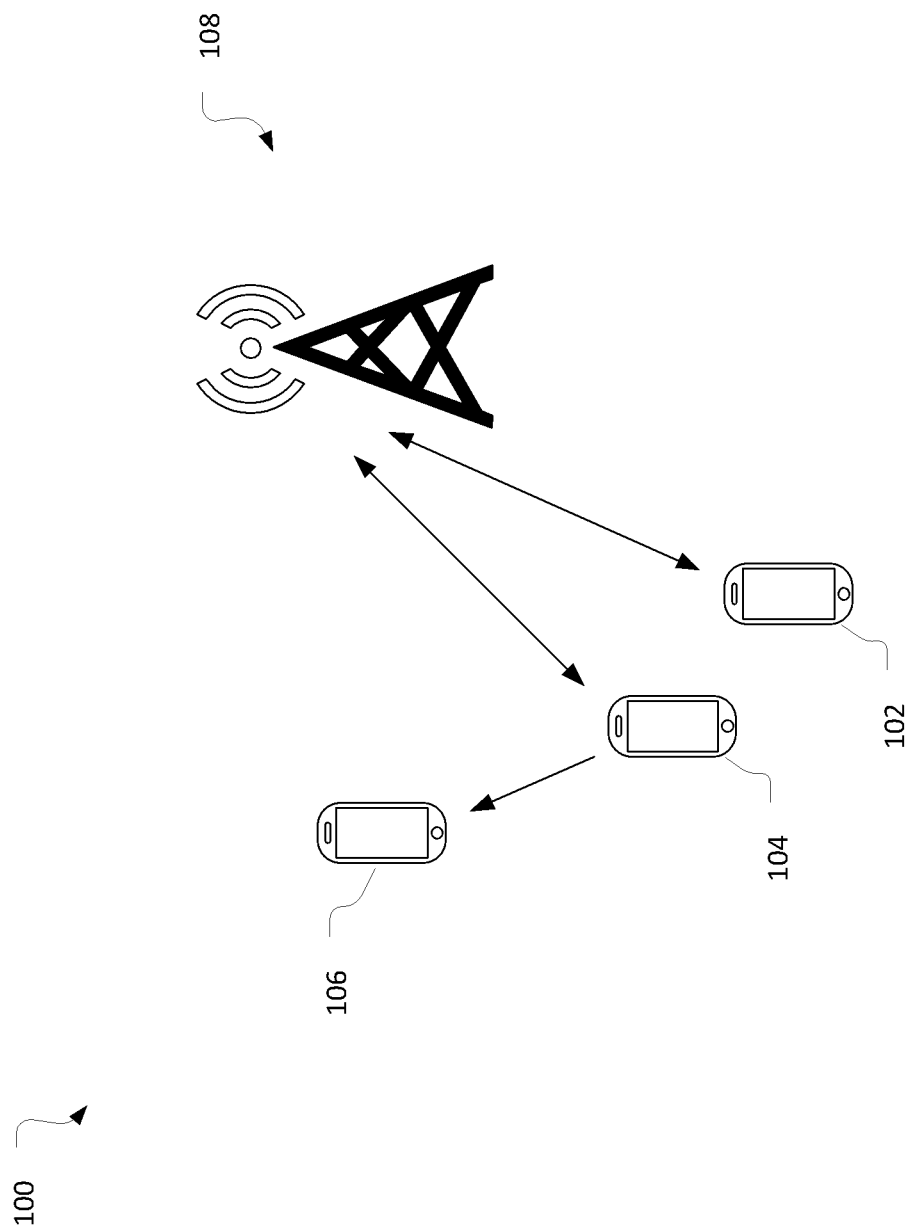
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some aspects. The network environment 100 may include UEs 102, 104, and 106, and a base station 108. The base station 108 may provide a wireless access cell through which one or more of the UEs 102/104/106 may communicate with the base station 108. In some aspects, the base station 108 is a gNB that provides 3GPP New Radio (NR) cell. The air interfaces over which the UEs 102/104/106 and base station 108 communicate may be compatible with 3GPP technical specifications (TSs) such as those that define Fifth Generation (5G) NR system standards.

Two or more of the UEs 102/104/106 may also communicate directly with one another over a sidelink interface. The sidelink interface may alternatively be referred to as a ProSe interface, device-to-device (D2D) interface, or a PC5 interface or reference point. In some aspects, the network environment 100 may be deployed within a vehicular communication system. In a vehicular communication system, the UEs 102/104/106 may communicate with one another using cellular vehicle-to-everything (V2X) communications. V2X may involve vehicle-to-vehicle (V2V), vehicle-to-infrastructure (V2I), vehicle-to-network (VTN), or vehicle-to-pedestrian (V2P) communications.

While FIG. 1 depicts the UEs 102/104/106 as mobile phones, the UEs 102/104/106 may be any type of user equipment such as those described below with respect to UE 1300 of FIG. 13.

The UEs 102/104/106 may communicate with one another using a sidelink resource pool. The sidelink resource pool may include a set of time/frequency resources for sidelink transmission or reception. The sidelink resource pool may be used for all unicast, groupcast, or broadcast communications for a given UE engaging in sidelink communications. In the frequency domain, the resource pool may include a plurality of subchannels, with each sub channel including a plurality of physical resource blocks (PRBs). In various aspects, a subchannel may include 10, 12, 15, 20, 25, 50, 75, or 100 PRBs, for example. In some aspects, the PRBs of a subchannel, and the subchannels of a resource pool may be contiguous.

In the time domain, a sidelink resource pool may include a plurality of slots, which may be contiguous or noncontiguous. In some aspects, the slots for a sidelink resource pool may be configured by, for example, a bitmap transmitted by the base station 108 to indicate which slots are part of a sidelink resource pool. The bitmap may have a periodicity of 10,240 ms and a bitmap length between 10-160. In some aspects, a physical slot may include all slots including non-sidelink slots, while a logical slot may only include slots in the resource pool. For example, consider a 10-bit bitmap as follows: [1, 1, 0, 1, 1, 0, 1, 1, 1, 1]. This bitmap indicates that 10 physical slots include 8 logical slots of a sidelink resource pool.

In other aspects, the sidelink resource pool may include time or frequency domains of other sizes.

Resources of the sidelink may be allocated in a number of ways. For example, in a first mode (mode 1), the base station 108 may provide a sidelink grant to a UE. In a second mode (mode 2), a UE may sense a sidelink channel and select its own resources from the sidelink resource pool for transmission.

Mode 2 resource allocation may include a plurality of operations including, for example: resource pool configuration; sensing; resource reevaluation; resource selection; preemption; and sidelink transmission.

Resource pool configuration may include the base station 108 providing a UE with the configuration information via control signaling, for example, radio resource control (RRC) signaling. Additionally/alternatively the configuration of the resource pool may include accessing predefined configuration information stored at a UE.

After a UE is configured with a resource pool, a transmitting UE may perform a sensing procedure. Within a sensing window, the transmitting UE will decode sidelink control information (SCI) to determine a data priority indication and resource reservation information. The transmitting UE may also measure energy of the resources to determine a channel quality metric such as, for example, reference signal received power (RSRP). The sidelink RSRP measurement may be based on physical sidelink control channel (PSCCH) demodulation reference signal (DMRS) or physical sidelink shared channel (PSSCH) DMRS.

Based on the sensing operation, the UE will select resources from within a resource selection window. The resources may be selected with a subchannel granularity in the frequency domain and a slot granularity in the time domain. The UE may identify candidate resources within the resource selection window. A resource of the resource selection window may be excluded from the candidate resources if it is reserved or its associated RSRP measurement is above a predetermined threshold. The UE may then select resources from the identified candidate resources. In some aspects, the selection may be randomized.

The UE may then encode the sidelink data on the selected resources for transmission.

UEs such as pedestrian UEs may have reduced power capabilities as compared to vehicle-based UEs. Thus, various alternatives to the above sensing modes may be used to reduce power consumption. Some of these alternatives includes a no-sensing mode, in which random resources are selected for transmission without sensing the channel, and a partial-sensing mode, in which a UE is configured with specific monitoring periods of a sensing window.

The sensing window may include a sensing window of, for example, 1 second, that includes a number of resource reservation periods of, for example, 100 ms. A UE may be configured with partial sensing by being provided a bitmap of, for example, 10-bits, to indicate which resource reservation periods the UE is to perform sensing.

Partial sensing in Long Term Evolution (LTE) V2X may be described as follows. At subframe m, there may be a one second sensing window [m−1000, m−1] and a resource selection window may be [m+T1, m+T2]. The UE may select Y subframes from the window and conduct sensing for candidate subframe N in selection window in {N−100*k}, where k is in a range of [1-10], for example, {k_i}=2, 4, 6, and 8. Thus, sensing may be skipped in some subframes.

In NR V2X, if a resource pool is configured (or preconfigured) with at least partial sensing, a UE performs contiguous partial sensing, and resource selection (or reselection) is triggered in slot n, the UE may select (or reselect) resources by monitoring slots between [n+T_A, n+T_B] and identifying candidate resources in or after slot n+T_B based on all available sensing results, including periodic-based partial sensing results if applicable.

Study of the following aspects is needed. How to set T_A and T_B (for example, should one or both be equal to zero, a positive value, or negative value); whether there should be exclusion of slots, whether the T_A/T_B values should be changed for different purposes; whether n can be replaced by, for example, an index of some of Y candidate slots; conditions in which contiguous partial sensing is to be performed; interaction with sidelink discontinuous reception (DRX), if any; and interaction with periodic-based partial sensing, if any. Some of these and other aspects are discussed in further detail herein.

Figure 2:
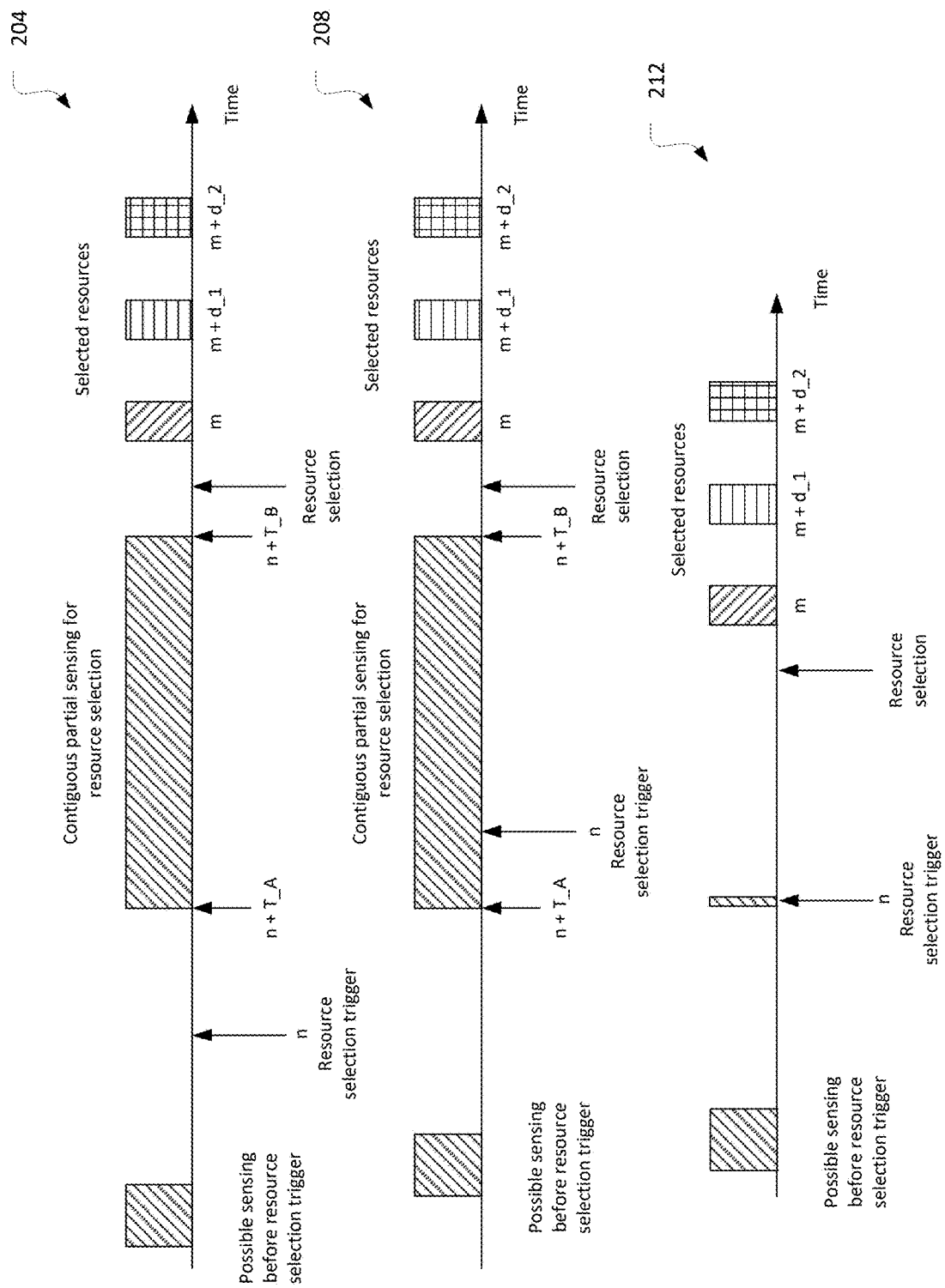
FIG. 2 includes operational diagrams of contiguous partial sensing in accordance with some aspects.

FIG. 2 illustrates operational diagrams of contiguous partial sensing that may be used in NR V2X to clarify concepts of the present embodiments. In 204, T_A and T_B are greater than zero. At n, the UE may detect a resource selection trigger. At n+T_A, the UE may begin contiguous partial sensing for resource selection until n+T_B. The resource selection may follow the contiguous partial sensing and a number of resources may be selected, for example, m, m+d_1, and m+d_2.

In 208, T_A is less than zero and T_B is greater than zero. This may be used in the event the UE has periodic data to transmit and has some previous knowledge of the occurrence of the resource selection trigger at n.

In 212, both T_A and T_B are set to zero. Thus, no contiguous sensing is performed in this situation. The resources may be selected randomly or based on a previous sensing.

Some embodiments describe how to determine a contiguous partial sensing window. For example, how to determine T_A and T_B for the contiguous partial sensing. For contiguous partial sensing, the UE may monitor slots between [n+T_A, n+T_B] and identify candidate resources in or after slot n+T_B. The T_A and T_B values may depend on sensing schemes performed at the UE and on traffic periodicity.

Figure 3:
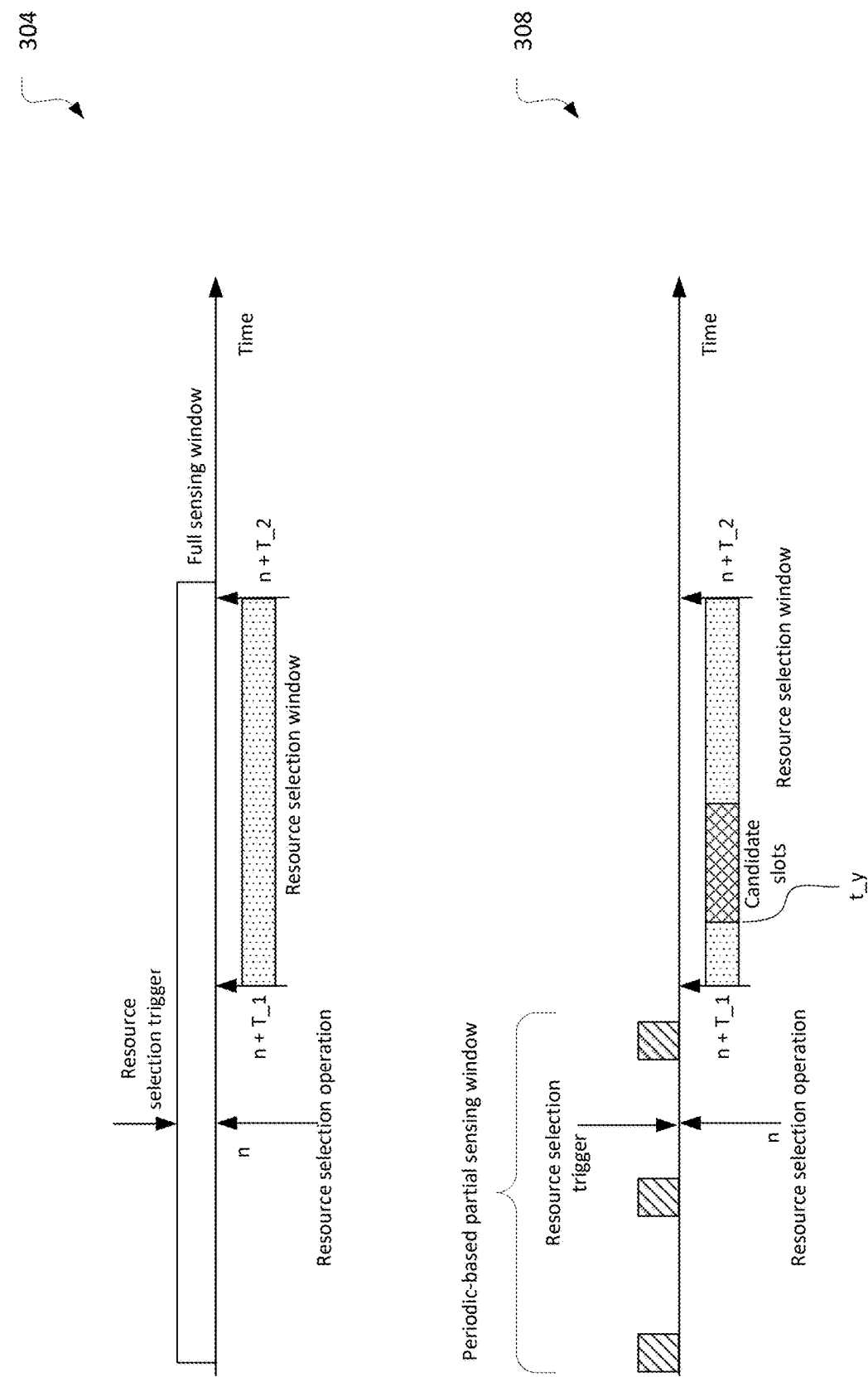
FIG. 3 includes operational diagrams of sensing schemes in accordance with some aspects.
Figure 4:
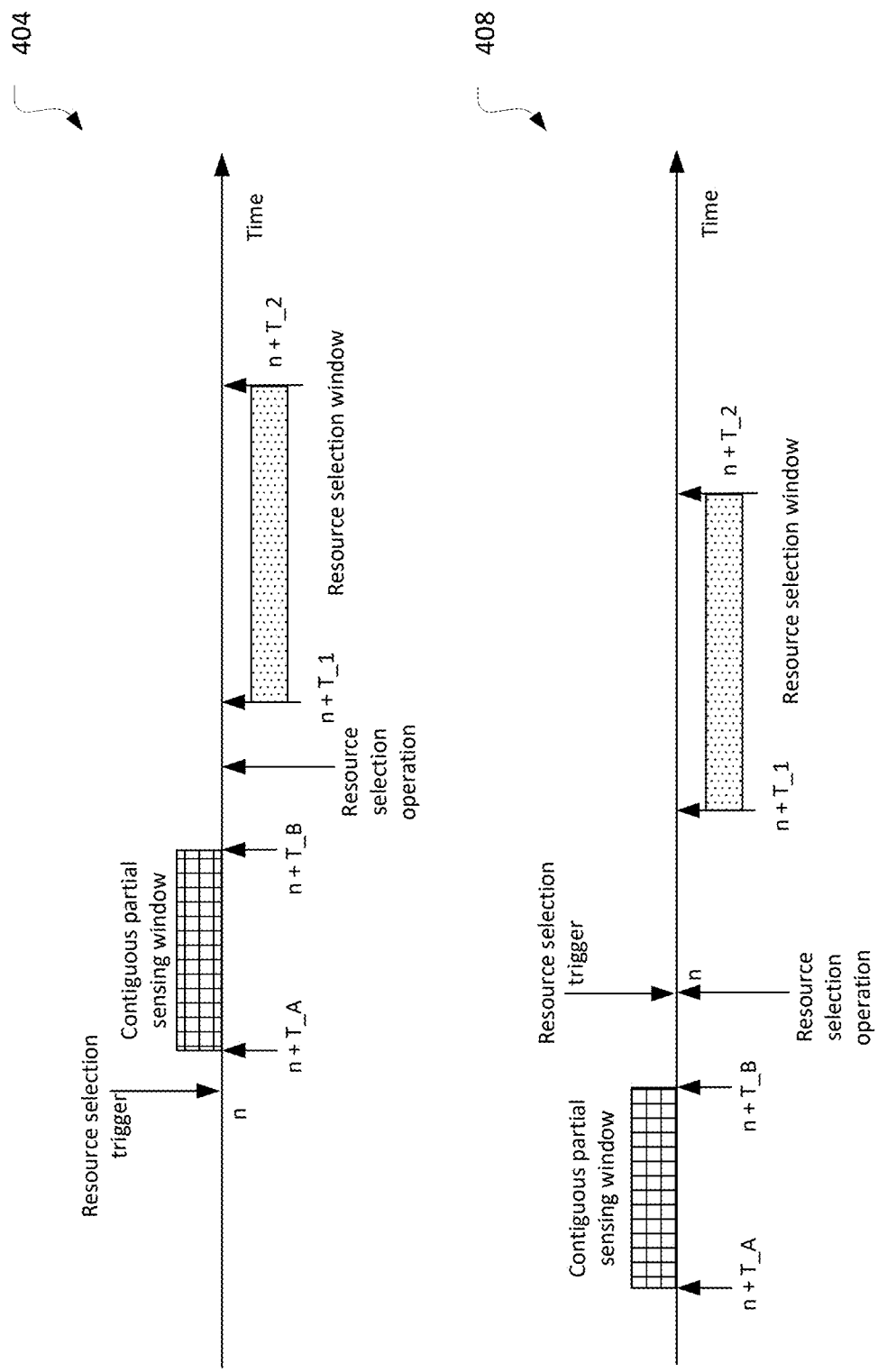
FIG. 4 includes additional operational diagrams of sensing schemes in accordance with some aspects.

FIGS. 3 and 4 illustrate operational diagrams of various sensing schemes that may be used in accordance with some embodiments.

Operational diagram 304 illustrates the UE using full sensing (for example, sense all slots) within a full sensing window. No additional contiguous partial sensing may be used, for example, T_A and T_B are set to zero.

Operational diagram 308 illustrates the UE using only periodic-based partial sensing without contiguous partial sensing (for example, T_A and T_B are set to zero). This may be applied if a resource pool supports partial sensing and the configured resource reservation periods (or configured sensing period P_reserve) include non-zero values.

The UE may periodically sense a channel within the periodic-based partial sensing window. The periodicity of the sensing occasions within the periodic-based partial sensing window may correspond to candidate slots within a resource selection window. The resource selection window may be defined by [n+T_1, n+T_2].

FIG. 4 illustrates operational diagrams in which the UE only uses contiguous partial sensing in accordance with some embodiments. This may be applied if a resource pool supports partial sensing or random resource selection in the configured resource reservation periods include zero values.

Operational diagram 404 illustrates the UE only using contiguous partial sensing with aperiodic traffic. For example, the transmitting UE has aperiodic traffic whose arrival time is unknown. In this embodiment, T_A may be set to zero or one and T_B may be set to R or R−T_proc,0. R is a length of a resource reservation window, which may be 31 or 32 slots in some embodiments. T_proc,0 is a processing time of sensing results, for example, a number of slots required by the UE to process the sensing results.

Operational diagram 408 illustrates the UE only using contiguous partial sensing with periodic traffic. For example, the transmitting UE has periodic traffic whose arrival time is predictable. In this embodiment, T_A may be set to −R or −R−T_proc,0 and T_B may be set to zero or −T_proc,0. Thus, in this embodiment, the entire contiguous partial sensing window may be set to occur before the resource selection operation or the resource selection trigger.

Figure 5:
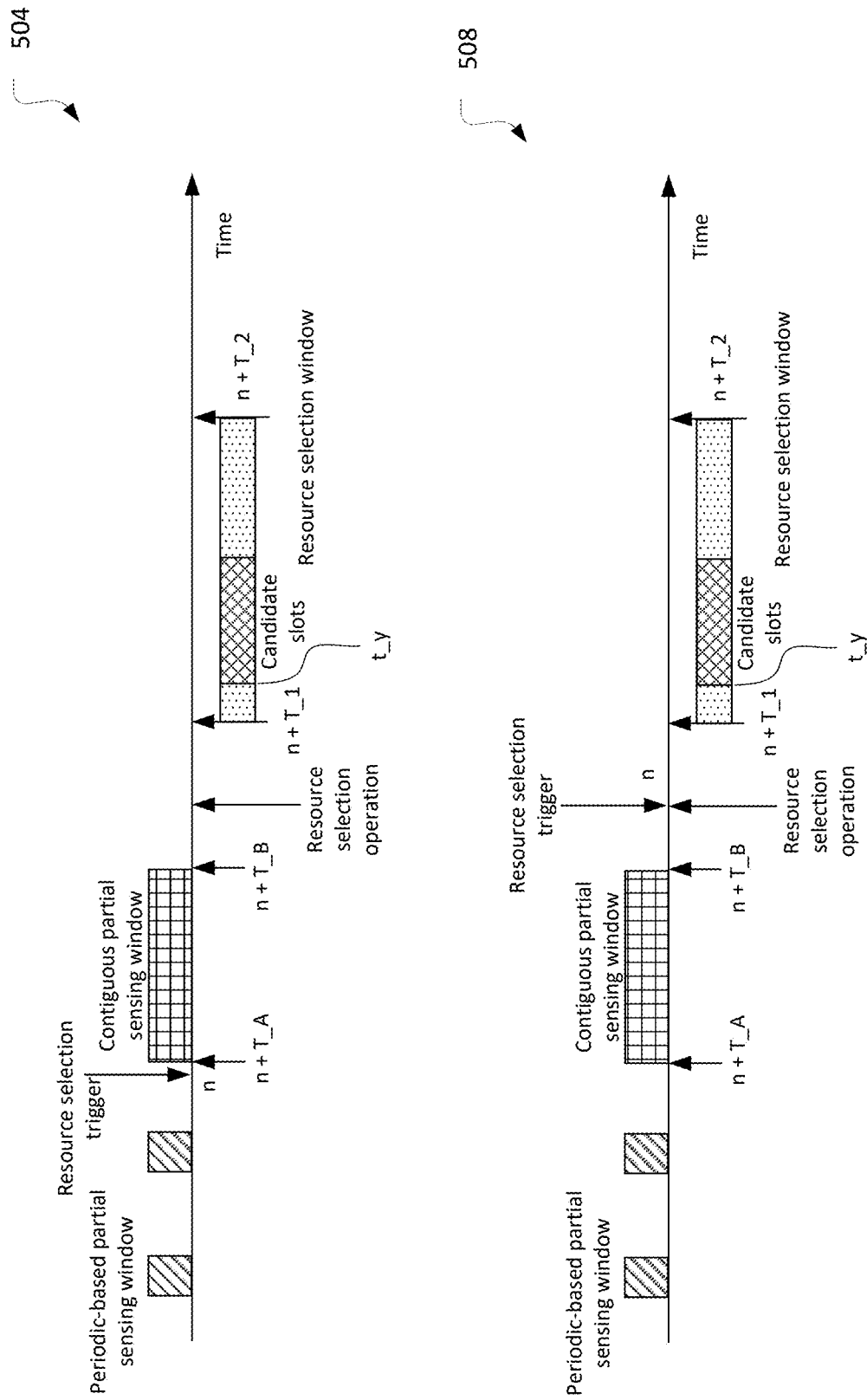
FIG. 5 includes operation diagrams in which both periodic-based partial sensing and contiguous partial sensing are used in accordance with some aspects.

FIG. 5 illustrates operational diagrams in which the UE uses both periodic-based partial sensing and contiguous partial sensing in accordance with some embodiments. This may be applied if the resource pool supports partial sensing or random resource selection and the configured resource reservation periods (or configured sensing period P_reserve) include both zero and nonzero values.

Operational diagram 504 illustrates the UE using both contiguous partial sensing and periodic-based partial sensing with aperiodic traffic. For example, the transmitting UE has aperiodic traffic whose arrival time is unknown. In this embodiment, T_A may be set to max{0, t_y−R} or max{1, t_y+R} and T_B may be set to max{T_A, t_y−T_proc,0} or max{T_A, t_y−T_proc,0−T_proc,1}. T_A and T_B may be nonnegative values. T_proc,1 may be the physical sidelink control channel (PSCCH)/physical sidelink shared channel (PSSCH) preparation time (for example, a number of slots required by the UE to prepare the sidelink transmissions). And t_y is a first slot of the candidate slots in the resource selection window. In some embodiments, t_y may be replaced with n+T_1 (for example, the start of the resource selection window).

Operational diagram 508 illustrates the UE using both contiguous partial sensing and periodic-based partial sensing with periodic traffic. For example, the transmitting UE has periodic traffic whose arrival time is predictable. In this embodiment, T_A may be set to t_y−R and T_B may be set to t_y−T_proc,0 or t_y−T_proc,0−T_proc,1. In some embodiments, t_y may be replaced with n+T_1 (for example, the start of the resource selection window).

In some embodiments, no sensing may be applied. For example, T_A and T_B may be set to zero so that no additional contiguous partial sensing is used by the UE. In this instance, the UE may randomly select resources.

In some embodiments, the values of T_A and T_B described above may be considered lower or upper bounds, rather than actual values. The actual value may be left to UE implementation within the bounded constraints.

In some embodiments, additional/alternative factors may be considered when determining the size and location of the contiguous partial sensing window. Some examples are provided below.

In a first example, determination of T_A and T_B of the contiguous partial sensing window may be based on remaining packet delay budget (PDB) of data to be transmitted. The resource selection window parameter T_2 must be smaller than the remaining PDB of the data in order to transmit the data in the desired timeframe. This may allow data with a larger remaining PDB to have a larger T_B (or T_A). Further, in some embodiments the time gap between T_B (or T_A) and a remaining PDB of the data has to be larger than a threshold to ensure a large enough resource selection window. This threshold may be preconfigured by configuration information of the resource pool. In some embodiments, a value of T_B may be set such that T_B<=remaining PDB−Threshold.

In a second example, determination of T_A and T_B of the contiguous partial sensing window may be based on a priority of data to be transmitted. For example, a size of the contiguous partial sensing window may be proportional to priority of the data. For data with a higher priority, T_B-T_A may be larger to ensure more reliable resource selection. A threshold/range may be defined per data priority.

In a third example, determination of T_A and T_B of the contiguous partial sensing window may be based on power/battery capability of the UE. For example, a UE having higher power/battery capabilities may include larger contiguous partial sensing windows (for example, have a larger T_B-T_A value).

In a fourth example, determination of T_A and T_B of the contiguous partial sensing window may be based on power/battery level of the UE. For example, a UE having higher power/battery levels may include larger contiguous partial sensing windows (for example, have a larger T_B-T_A value).

In a fifth example, determination of T_A and T_B of the contiguous partial sensing window may be based on a configured T_2,min per data priority. The resource selection window parameter T_2 has to be larger than a configured T_2,min per data priority. Thus, for a larger configured T_2,min, the T_B (or T_A) may be larger. Further, the time gap between T_B (or T_A) and configured T_2,min of the data may need to be larger than a threshold to ensure a large enough resource selection window. The threshold may be preconfigured and T_B may be set such that T_B<=Configure T_2,min−Threshold.

In a sixth example, determination of T_A and T_B of the contiguous partial sensing window may be based on data periodicity. The contiguous partial sensing window (for example, T_B-T_A) may be larger for periodic data transmissions and smaller for aperiodic data transmissions. Further, one or more periodicity thresholds may be defined to set different sizes for the contiguous partial sensing window. In general, periodic data transmissions with smaller periodicities (for example, smaller than a threshold), T_B-T_A may be larger.

In a seventh example, determination of T_A and T_B of the contiguous partial sensing window may be based on a channel busy ratio (CBR). For example, the contiguous partial sensing window (for example, T_B-T_A) may be proportional with a CBR level. A larger contiguous partial sensing window may be used for higher levels of CBR (for example, a more congested channel).

In an eighth example, determination of T_A and T_B of the contiguous partial sensing window may be based on configuration signaling between UEs. The configuration signaling may be RRC signaling transmitted over a PC5 interface. For example, a transmitting UE may configure a receiving UE with an indication of the contiguous partial sensing window, or vice versa.

One or more of these examples may be used in combination with one another.

Some embodiments describe the interaction and relationship between contiguous partial sensing and sidelink DRX. These embodiments described applied to positive, zero, and negative T_A/T_B values as well as periodic/aperiodic traffic.

In some situations, a contiguous partial sensing window, defined by (n+T_A, n+T_B), may overlap with a sidelink DRX off duration. This situation may be addressed in the following options. In the options, the updated contiguous partial sensing window may be defined by (n+T'_A, n+T'_B).

In a first option, the UE may ignore the sidelink DRX configuration and perform the contiguous partial sensing in the originally configured contiguous partial sensing window. Thus, the updated window is set equal to the originally configured window, for example, T'_A may be set to T_A and T'_B may be set T_B. The UE may then exit the sidelink DRX off mode at the resource selection trigger and stay in the sidelink DRX on mode after resource selection.

In a second option, the UE may shift the contiguous partial sensing window. The second option may include three sub-options (options 2-1, 2-2, and 2-3).

Figure 6:
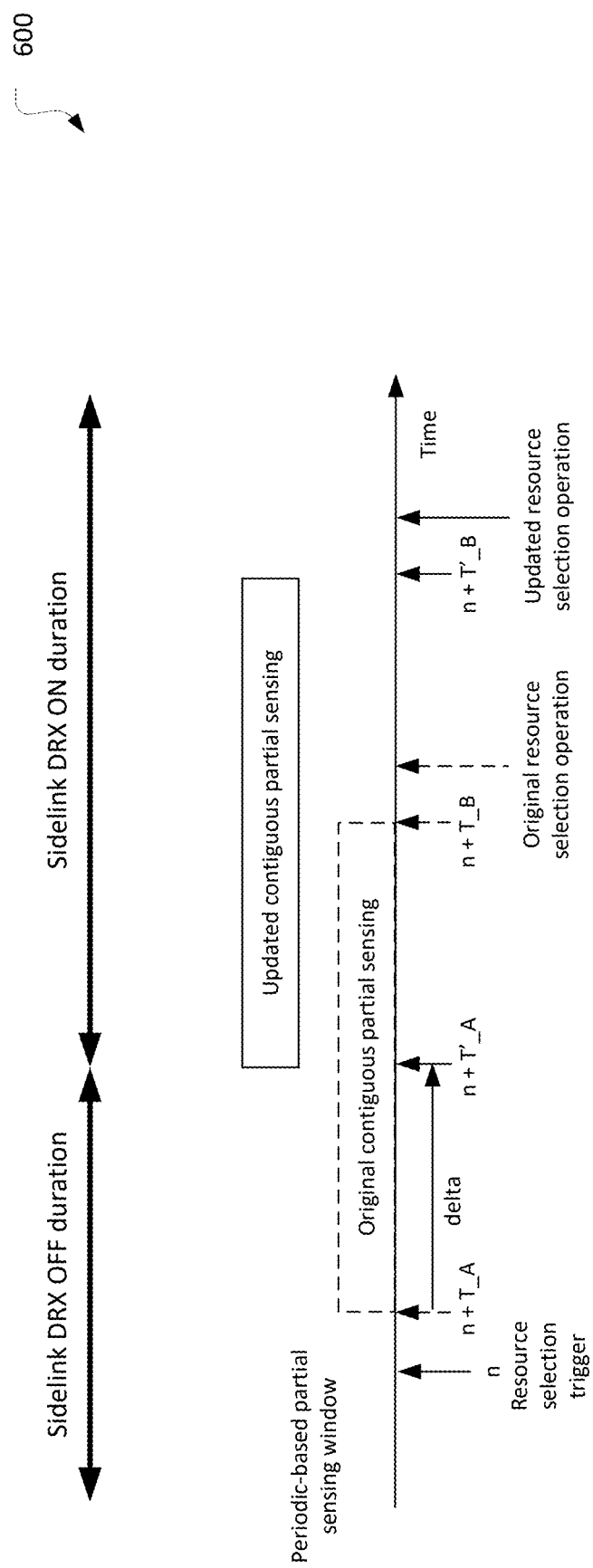
FIG. 6 includes an operational diagram that describes generating an updated contiguous partial sensing window by shifting an original contiguous partial sensing window in accordance with some aspects.

In option 2-1, the UE may shift the contiguous partial sensing window under control of the physical layer of the UE. FIG. 6 is an operational diagram 600 that describes generating an updated contiguous partial sensing window by shifting the original contiguous partial sensing window in accordance with some embodiments. This may be done under the assumption that a sensing operation is not supported in the sidelink DRX off duration.

The UE may determine a delta value that, when added to T_A and T_B, shifts the window into the sidelink DRX on duration. The delta value may be added to both T_A and T_B to determine the corresponding parameters of the updated contiguous partial sensing window. For example, T'_A=T_A+delta and T'_B=T_B+delta. In some embodiments, the delta value may be just enough to set the beginning of the updated contiguous partial sensing window in the sidelink DRX on duration. In other embodiments, the delta value may set the beginning of the updated contiguous partial sensing window in the sidelink DRX on duration by some margin that is greater than zero.

In some embodiments, the determination and application of the delta value to shift the contiguous partial sensing into the sidelink DRX on duration may be controlled or otherwise performed by a physical layer of the UE.

Figure 7:
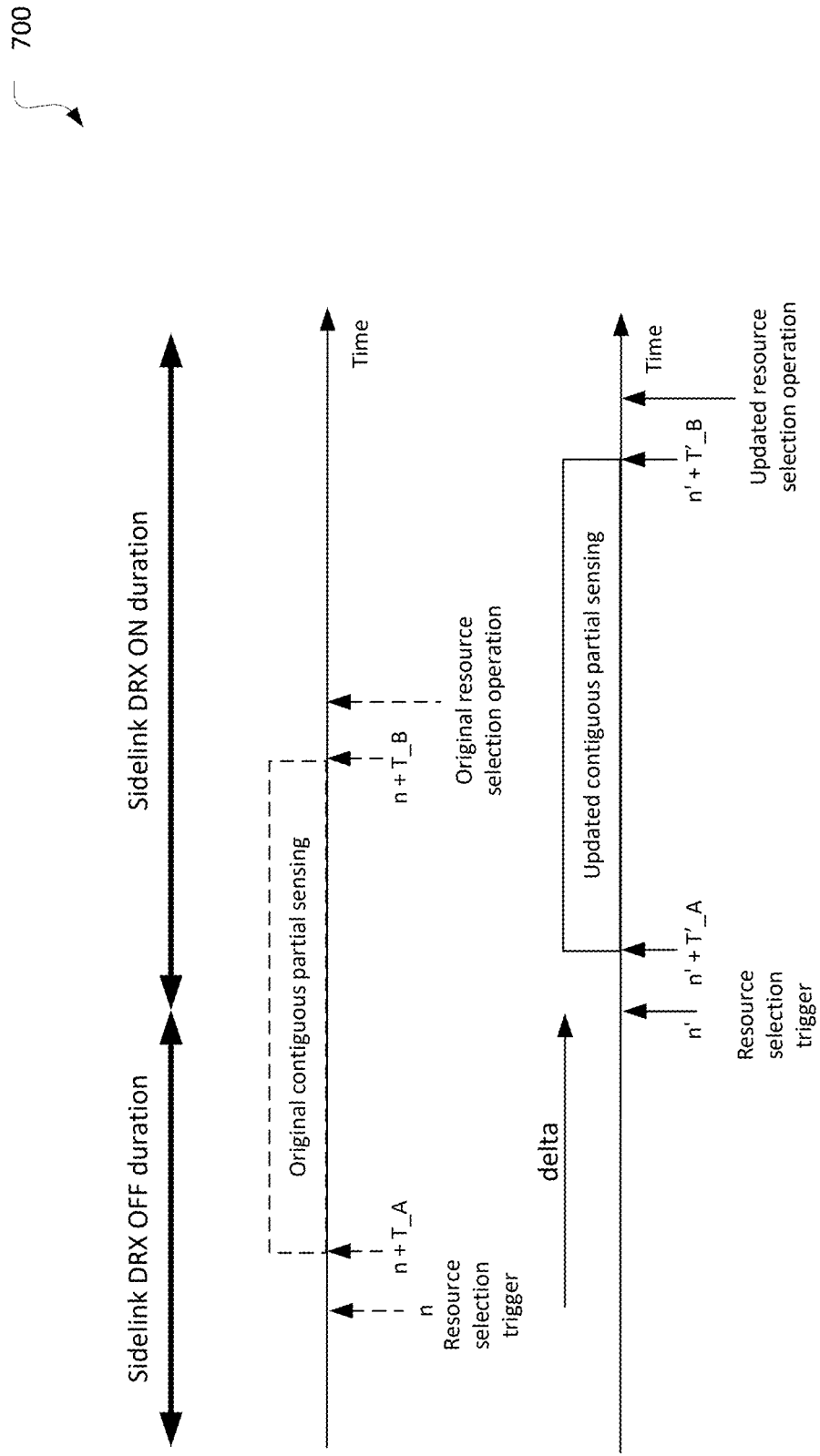
FIG. 7 is an operational diagram that describes generating an updated contiguous partial sensing window by shifting the original contiguous partial sensing window in accordance with some aspects.

In option 2-2, the UE may shift the resource selection trigger time to beginning of the sidelink DRX on duration under control of the MAC layer of the UE. FIG. 7 is an operational diagram 700 that describes generating an updated contiguous partial sensing window by shifting the original contiguous partial sensing window in accordance with some embodiments. This may be done under the assumption that a sensing operation is not supported in the sidelink DRX off duration.

The UE may delay a resource selection trigger time to a beginning of a sidelink DRX on duration. This may be done by the MAC layer detecting the resource selection trigger and delaying provision of the resource selection trigger to the PHY layer by a delta value. The resource selection trigger may be presented to the PHY layer at n' to set T'_A=n'+T_A and T'_B=n'+T_B.

In some embodiments, the delta value may be set at a value to move the resource selection trigger to the beginning of the sidelink DRX on duration. In other embodiments, the delta value may be set at a value to move the resource selection trigger to T_A before the sidelink DRX on duration so that the updated contiguous partial sensing window starts at the beginning of the sidelink DRX on duration.

Figure 8:
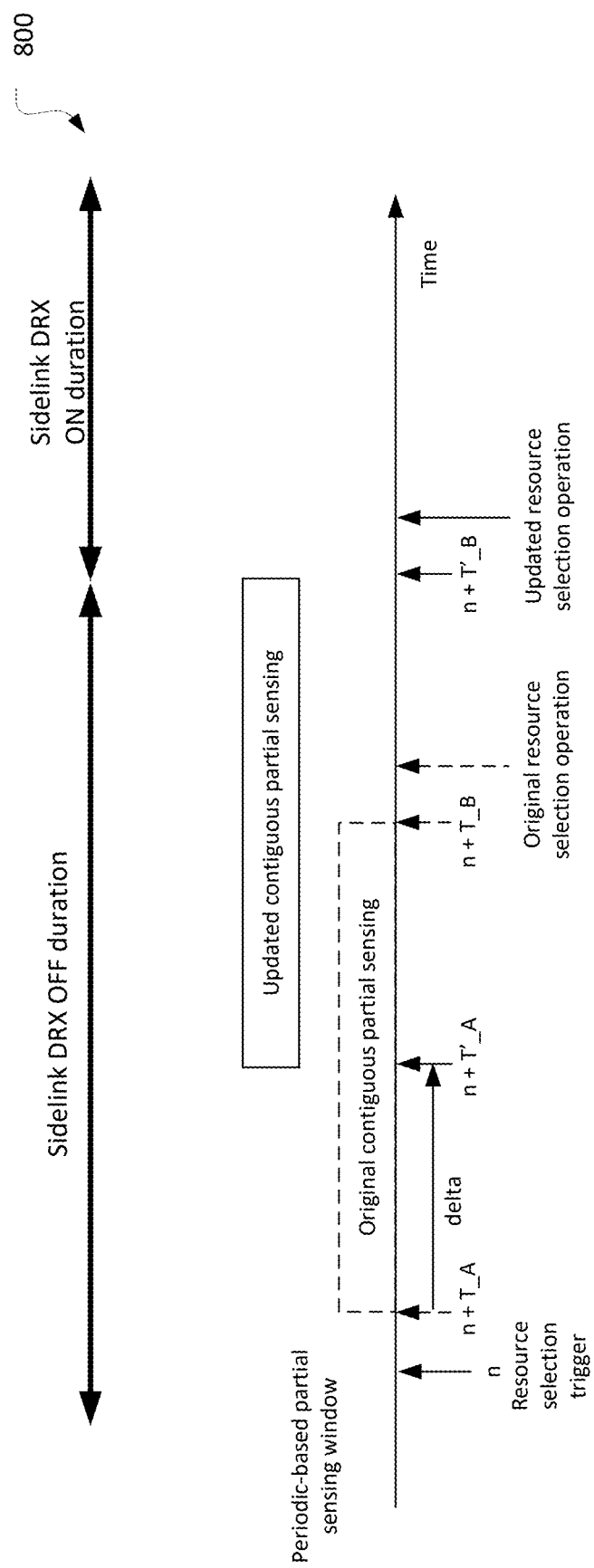
FIG. 8 is an operational diagram that describes generating an updated contiguous partial sensing window by delaying the original contiguous partial sensing window within a sidelink discontinuous reception off duration in accordance with some aspects.

In option 2-3, the UE may delay the contiguous partial sensing window within the sidelink DRX off duration. FIG. 8 is an operational diagram 800 that describes generating an updated contiguous partial sensing window by delaying the original contiguous partial sensing window within the sidelink DRX off duration in accordance with some embodiments. This may be done under the assumption that a sensing operation is supported in the sidelink DRX off duration.

The UE may shift an ending time of the contiguous partial sensing window to an end of the sidelink DRX off duration. This may be done by adding a delta value to the T_B value to set T'_B to occur at or near an end of the sidelink DRX off duration or a start of the sidelink DRX on duration. As shown, the same delta value may also be added to the T_A value to provide the updated contiguous partial sensing window with the same length as the original contiguous partial sensing window.

In some embodiments, the sensing results processing time may be considered. For example, the updated contiguous partial sensing window may end T_proc,0 (or T_proc,1) before the sidelink DRX off duration.

In some embodiments, it may be possible for the contiguous partial sensing to always exist at or around an end of the sidelink DRX off duration or a start of the sidelink DRX on duration. That is, the contiguous partial sensing window may be set independent of the resource selection trigger.

Figure 9:
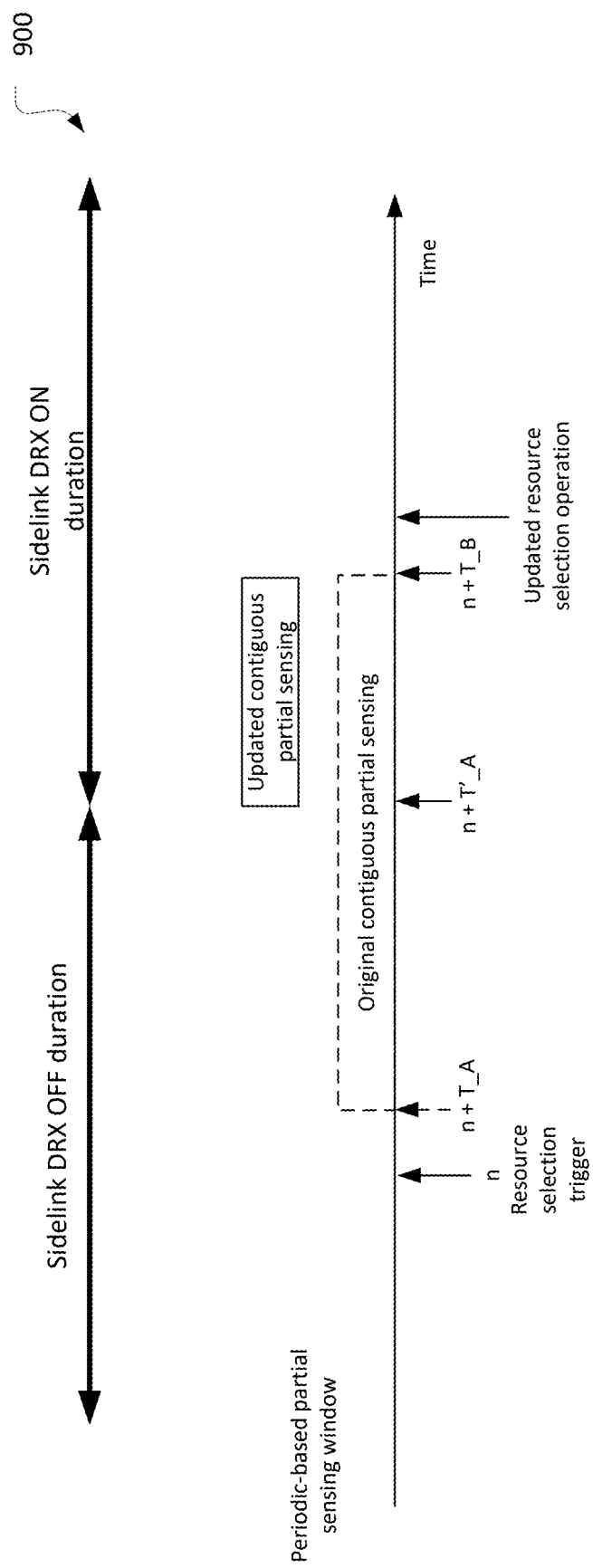
FIG. 9 is an operational diagram that describes generating the updated contiguous partial sensing window based on an intersection of the original contiguous partial sensing window and a sidelink discontinuous reception on duration in accordance with some aspects.

In a third option, the UE may generate the updated contiguous partial sensing window based on an intersection between the original contiguous partial sensing window and the sidelink DRX on duration. FIG. 9 is an operational diagram 900 that describes generating the updated contiguous partial sensing window based on an intersection of the original contiguous partial sensing window and the sidelink DRX on duration in accordance with some embodiments. This may be done under the assumption that a sensing operation is not supported in the sidelink DRX off duration.

The UE may add a delta value to T_A to set a beginning of the updated contiguous partial sensing window to align with the beginning of the sidelink DRX on duration. For example, T'_A=T_A+delta. In this embodiment, a similar delta value may not be added to T_B. For example, T'_B=T_B. Thus, the updated contiguous partial sensing window may be shorter in length than the original contiguous partial sensing window.

In this option, the UE may perform the contiguous partial sensing only in the intersection of the sidelink DRX on duration (SL DRX ON) and the original contiguous partial sensing window. For example, [n+T'_A, n+T'_B]=[SL DRX ON]∩[n+T_A, n+T_B].

In a fourth option, the UE may simply ignore the contiguous partial sensing window if it is configured in a sidelink DRX off duration in which sensing operation is not supported. The UE may completely skip the contiguous partial sensing operations by setting T'_A and T'_B to zero.

Figure 10:
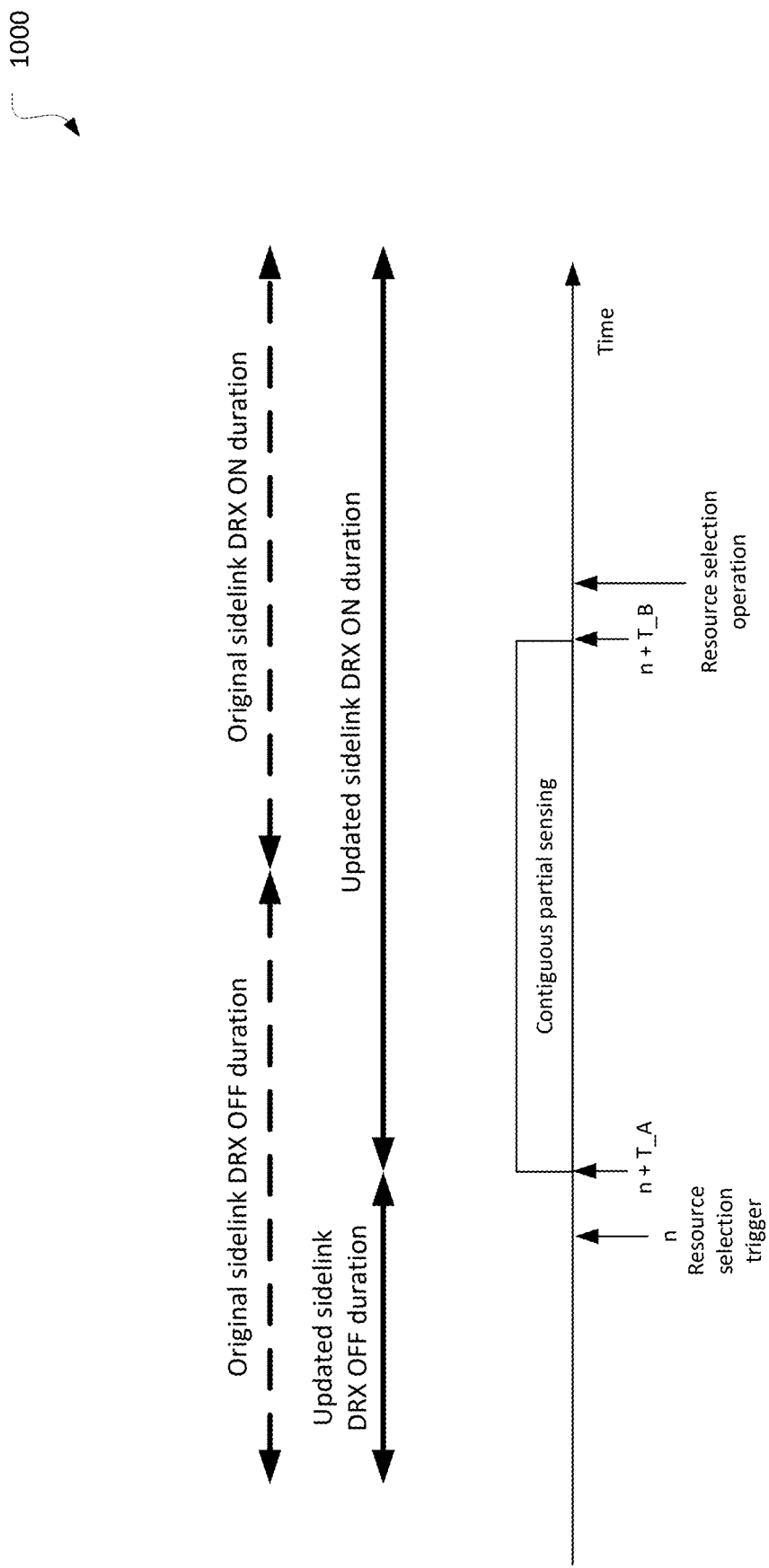
FIG. 10 is an operational diagram that describes reconfiguring sidelink discontinuous reception in accordance with some aspects.

In a fifth option, the UE may reconfigure the sidelink DRX to avoid overlapping with the contiguous partial sensing. FIG. 10 is an operational diagram 1000 that describes reconfiguring the sidelink DRX in accordance with some embodiments. This may be under the assumption that a sensing operation is not supported in the sidelink DRX off duration.

In some embodiments, the DRX may be reconfigured in situations in which the UE has periodic traffic whose resource selection trigger is predictable. In the sidelink DRX configuration, the on duration may be extended either beforehand or afterwards to align with a beginning of the predictable contiguous partial sensing window. In this manner, updated sidelink DRX off/on durations may be determined and applied as shown in FIG. 10.

Figure 11:
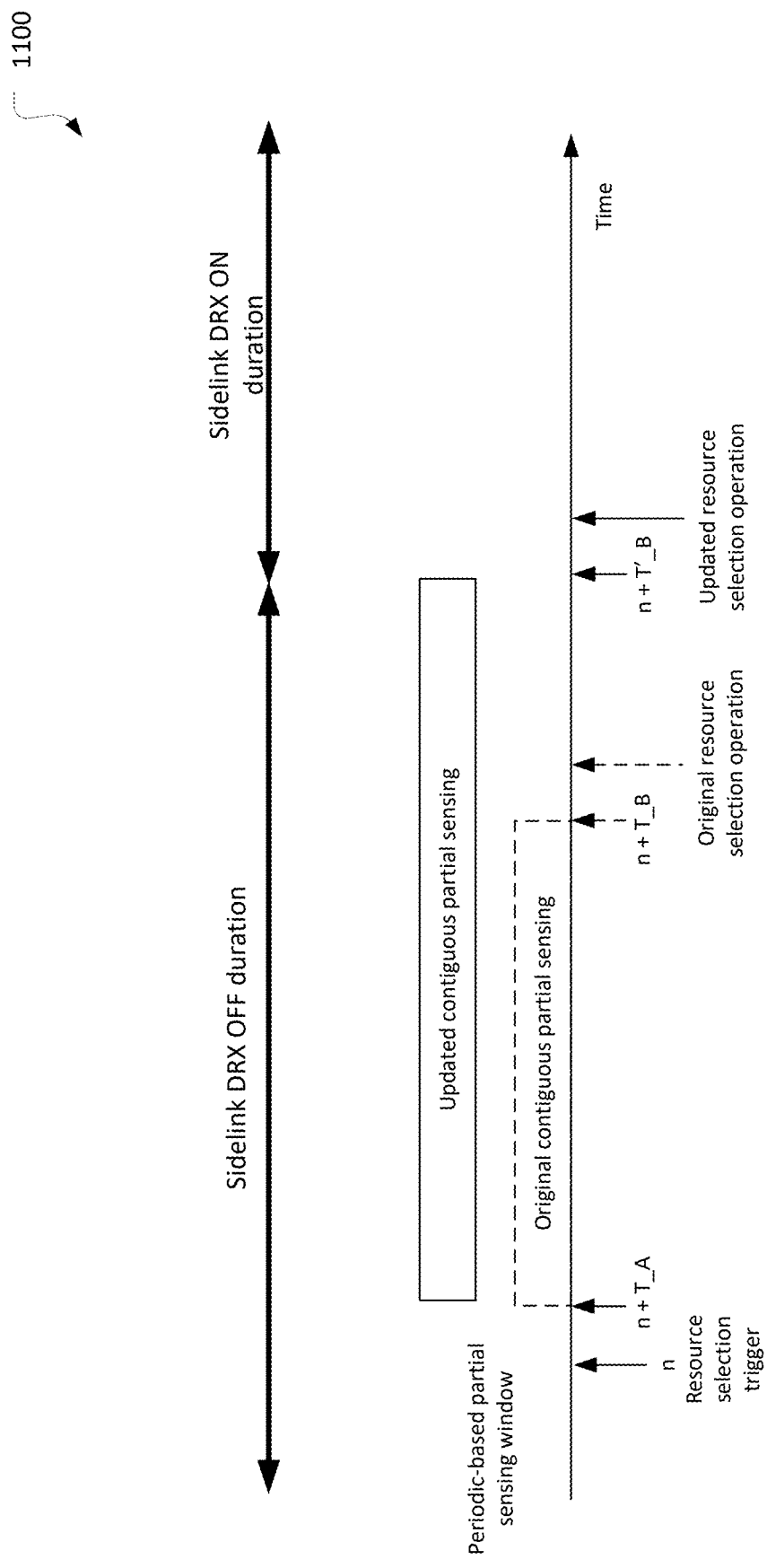
FIG. 11 is an operational diagram that describes generating an updated contiguous partial sensing window by extending an end of the window in accordance with some aspects.

In a sixth option, the UE may prolong the contiguous partial sensing window size until the beginning of the sidelink DRX on duration. FIG. 11 is an operational diagram 1100 that describes generating an updated contiguous partial sensing window by extending an end of the window in accordance with some embodiments. This may be done under the assumption that a sensing operation is supported in the sidelink DRX off duration.

In this example, the updated contiguous partial sensing window may be extended to end at or around an end of the sidelink DRX off duration or a beginning of the sidelink DRX on duration. This may be done by adding a delta value to the T_B value to set T'_B (for example, T'_B=T_B+delta) to occur at or near an end of the sidelink DRX off duration or a start of the sidelink DRX on duration. In contrast to the fourth example discussed above, the starting time of the contiguous partial sensing window may not be changed. Thus, the delta value may not be added to the T_A value (for example, T'_A=T_A).

In some embodiments, the sensing results processing time may be considered. For example, the updated contiguous partial sensing window may end T_proc,0 (or T_proc,1) before the sidelink DRX off duration.

Performing the sensing in the updated contiguous partial sensing window of this embodiment may be associated with more power consumption than performing the sensing in the original contiguous partial sensing window. However, it may also be associated with more reliable sensing results.

The various options described above to deal with the interaction between contiguous partial sensing and sidelink DRX may be selected based on various considerations. The following examples describe some such considerations.

In a first example, the selected option may depend on power consumption. In general, power consumption of the different options may be as follows: option 5/6>option 1/2>option 3>option 4.

In a second example, the selected option may depend on the PDB of the data to be transmitted. In general, for data with a larger PDB, options 2 or 6 may be selected. Otherwise, options 1, 3, 4, or 5 may be selected.

In a third example, the selected option may depend on data periodicity. For periodic data transmissions, options 1, 2, 5, or 6 may be selected. For aperiodic data transmissions, option 4 may be selected.

Further, options 1, 2, 5, or 6 may be selected for periodic data transmissions having smaller periodicities (for example, smaller than a predetermined threshold).

In a fourth example, the selected option may depend on CBR. For example, for a higher level of CBR (for example, a more congested channel), options 1, 2, 5, or 6 may be selected.

In a fifth example, the selected option may depend on a power/battery capability of the UE or a power/battery level of the UE. For example, a UE with a higher power/battery capability/level may select options 1, 2, 5, or 6. A UE with lower power/battery capability/level may select option 4.

In a sixth example, the selected option may depend on a priority of the data to be transmitted. For example, for data with higher priority, options 1, 2, 5, or 6 may be selected.

Various aspects also describe enhancements to periodic-based partial sensing.

In a resource pool that is configured (or preconfigured) with at least partial sensing, if a UE performs periodic-based partial sensing, at least when the reservation for another transport block (TB) (when carried in SCI) is enabled for a resource pool and resource selection/reselection is triggered at slot n, it may be up to UE implementation to determine a set of Y candidate slots within a resource selection window. Points of further study include condition and timing for which periodic-based partial sensing is performed by the UE.

As discussed above, the resource selection window may be defined by [n+T_1, n+T_2]. As a baseline, T_1 and T_2 may be defined in a manner similar to that described in Release 16 of NR-V2X according to step 1 of section 8.1.4 of 3GPP TS 38.214 v16.5.0 (2021-03-30). Consideration may be made of whether to introduce a threshold to redefine T_1 and T_2 such that T_1>=0 (subject to processing time constraint, T_proc,1), and T_2<=remaining PDB; and T_1−T_2<=(pre-) configured threshold.

The minimum value for Y may be (pre-)configured from a range of values.

Further consideration may be made as to whether any restriction should be implemented to determine Y candidate slots (including its relationship with sidelink DRX). Additional consideration may also be made as to whether the resource selection window should be confined within a set of periodic set of resources and its relationship with sidelink DRX.

Unless otherwise described herein, periodic-based partial sensing may be similar to partial sensing used in LTE for V2X (LTE-V).

In a resource pool (pre-)configured with at least partial sensing, if a UE performs periodic-based partial sensing, at least when the reservation for another TB (when carried in SCI) is enabled for the resource pool and resource selection/reselection is triggered at slot n, the UE may monitor slots of at least one of a set of periodic sensing occasions. A periodic sensing occasion is a set of slots according to $t_{y-k*P_{reserve}}^{SL}$, if $t_y^{SL}$ is included in the set of Y candidate slots.

P_reserve is a periodicity value from the configured set of possible resource reservation periods allowed in the resource pool (sl-ResourceReservePeriodList). It may be selected based on one of the following options. In option 1, P_reserve may correspond to all values from a configured set sl_ResourceReservePeriodList. In option 2, P_reserve may correspond to a subset of values from the configured set sl_ResourceReservePeriodList. Determination of the subset (for example, by (pre-)configuration or UE determination) may be further considered. In option 3, P_reserve may be a common divisor among values in the configured set sl_ResourceReservePeriodList. Other options may also be considered.

The value k may be selected according to one of the following options. In option 1, only the most recent sensing occasion for a given reservation periodicity before the resource (re)selection trigger or the set of Y candidate slots subject to processing time restriction. In option 2, the two most recent sensing occasions for a given reservation periodicity before the resource (re)selection trigger or the set of Y candidate slots subject to processing time restriction. In option 3, all possible sensing occasions after n−T_0. T_0 may define the earliest sensing occasion allowed. It may be predefined value of, for example, 1 second (for LTE V2X) or 1100 ms or 100 ms by configuration (for NR V2X). In option 4, only one periodic sensing occasion for one reservation period. The k value may be up to UE implementation with a maximum value being (pre-)configured. In option 5, k may be (pre-) configured, including multiple values. In option 6, a (pre-) configuration of a bitmap similar to, for example, LTE-V. Other options may be considered.

Further study may be provided with respect to a relationship between periodic sensing occasions and sidelink DRX; and conditions and timing for which periodic-based partial sensing is performed by the UE.

Figure 12:
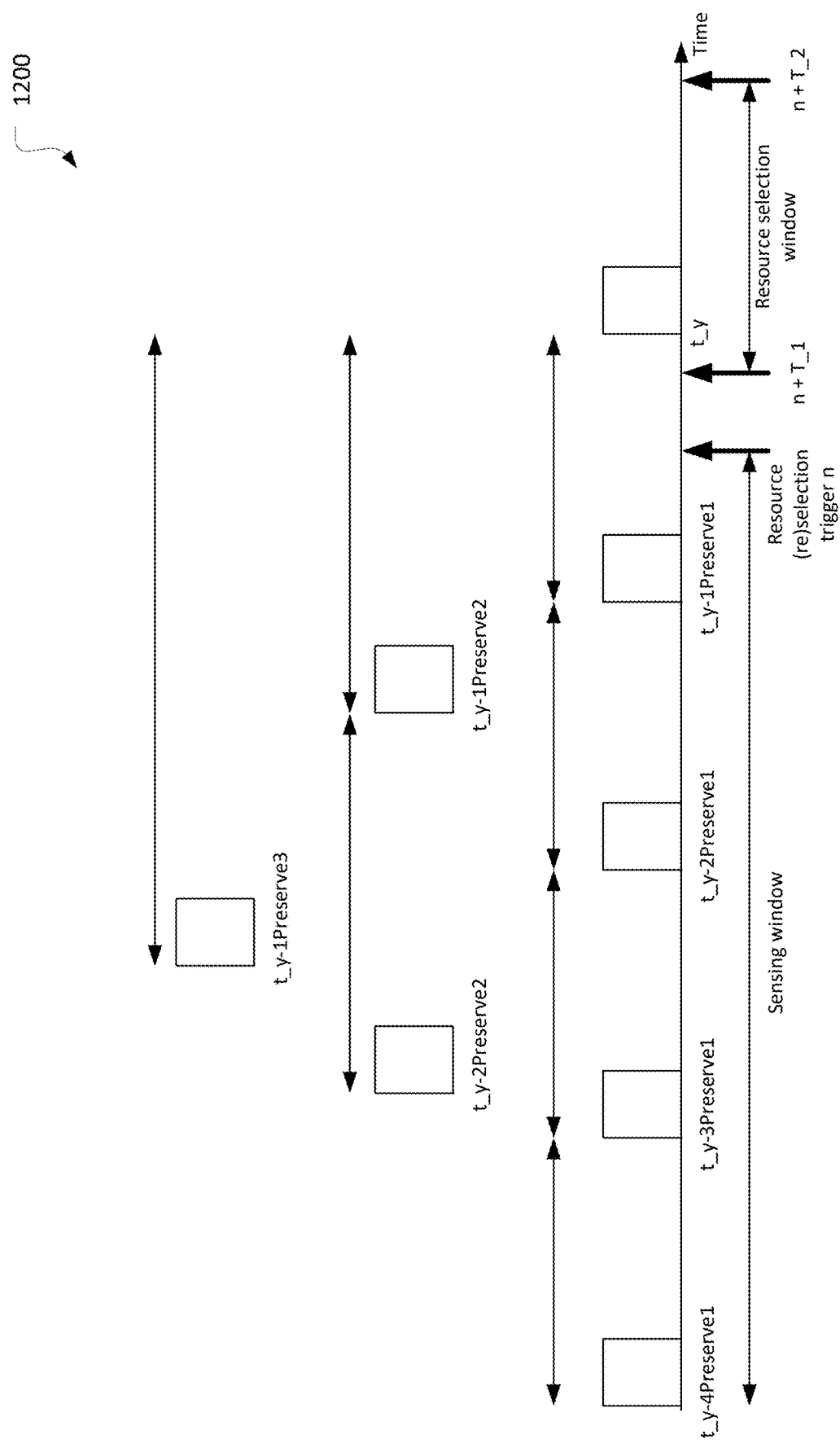
FIG. 12 is an operational diagram describing partial sensing that may be used in accordance with some aspects.

FIG. 12 is an operational diagram 1200 describing partial sensing that may be used in embodiments of the present disclosure. A resource pool may be configured with up to, for example, 16 resource reservation periods. For a given candidate resource in a resource selection window, a UE may monitor sensing occasions that correspond to the resource reservation periods configured/activated for the resource pool. As shown in operational diagram 1200, the UE may monitor sensing occasions with respect to three different resource reservation periods (P_reserve1, P_reserve2, and P_reserve3). For P_reserve1, k may be set to 4 and, therefore, the UE may monitor four sensing occasions in the sensing window. For P_reserve2, k may be set to 2 and, therefore, the UE may monitor two sensing occasions in the sensing window. For P_reserve3, k may be set to 1 and, therefore, the UE may monitor one sensing occasion in the sensing window.

Embodiments of the present disclosure describe how to determine a minimum value for Y candidate slots in a resource selection window; how to determine a relationship between periodic sensing occasions and sidelink DRX; how to determine the k and P_reserve for periodic-based partial sensing; and how to increase reliability of random resource selection.

In some embodiments, determining a minimum number of candidate slots in partial sensing may be performed as follows. Consider the minimum number of candidate slots to be Y_min.

In a first option, Y_min may depend on a number of resources to be selected for a TB. The number of resources (N) selected for a TB can be one, two, or three slots. In general, Y_min may be proportional to N. For example, if N is larger, Y_min is larger. Some example Y/N value pairs may include Y_min=5 slots if N=1; Y_min=10 slots if N=2; and Y_min=15 slots if N=3.

In a second option, Y_min may depend on a sidelink DRX configuration. Sidelink DRX may be configured either at a transmit (Tx) UE, a receive (Rx) UE, or both Tx and Rx UEs. If the sidelink DRX is configured for Rx UE, then the resource selection window may be restricted to a DRX on duration of the Rx UE. Y_min (or Y) within this restricted resource selection window may also be reduced.

Y_min may be smaller when sidelink DRX is configured at least at the Rx UE side, which restricts the resource selection window. Restriction on the resource selection window is reflected by T_2−T_1. For example, if T_2−T_1<Thres1, then Y_min may be five slots; if Thres1<=T_2−T_1<Thres2, then Y_min may be 10 slots; and if T_2−T_1>=Thres2, then Y_min may be 15 slots. The first and second thresholds (Thres1 and Thres2) may be (pre-)configured thresholds.

Figure 13:
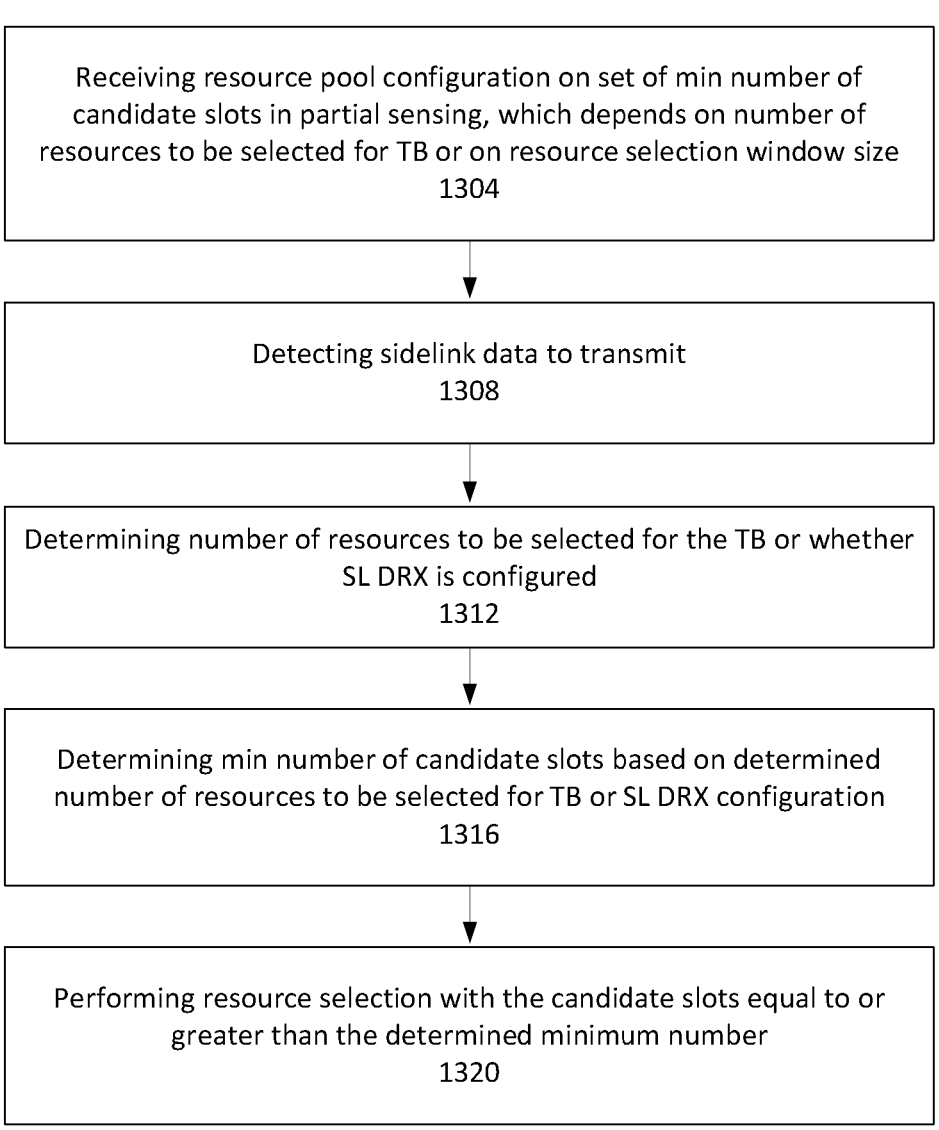
FIG. 13 is an operational flow/algorithmic structure in accordance with some aspects.

FIG. 13 illustrates an operational flow/algorithmic structure 1300 in accordance with some embodiments. The operational flow/algorithmic structure 1300 may be used to determine a minimum number of candidate slots in partial sensing. The operational flow/algorithmic structure 1300 may be implemented by a UE such as, for example, UEs 102, 104, 106, or 2700 or components thereof, for example, baseband circuitry 2704A.

The operation flow/algorithmic structure 1300 may include, at 1304, receiving resource pool configuration on a set of a minimum number of candidate slots in partial sensing. The minimum number of candidate slots may depend on a number of resources to be selected or on a resource selection window size, which may also be based on a sidelink DRX configuration.

The operation flow/algorithmic structure 1300 may further include, at 1308, detecting sidelink data to transmit.

The operation flow/algorithmic structure 1300 may further include, at 1312, determining a number of resources to be selected for a TB to transmit the sidelink data or whether sidelink DRX is configured.

The operation flow/algorithmic structure 1300 may further include, at 1316, determining a minimum number of candidate slots based on the determined number of resources to be selected for the TB or whether the sidelink DRX is configured.

The operation flow/algorithmic structure 1300 may further include, at 1320, performing resource selection with the candidate slots being equal to or greater than the determined minimum number.

Figure 14:
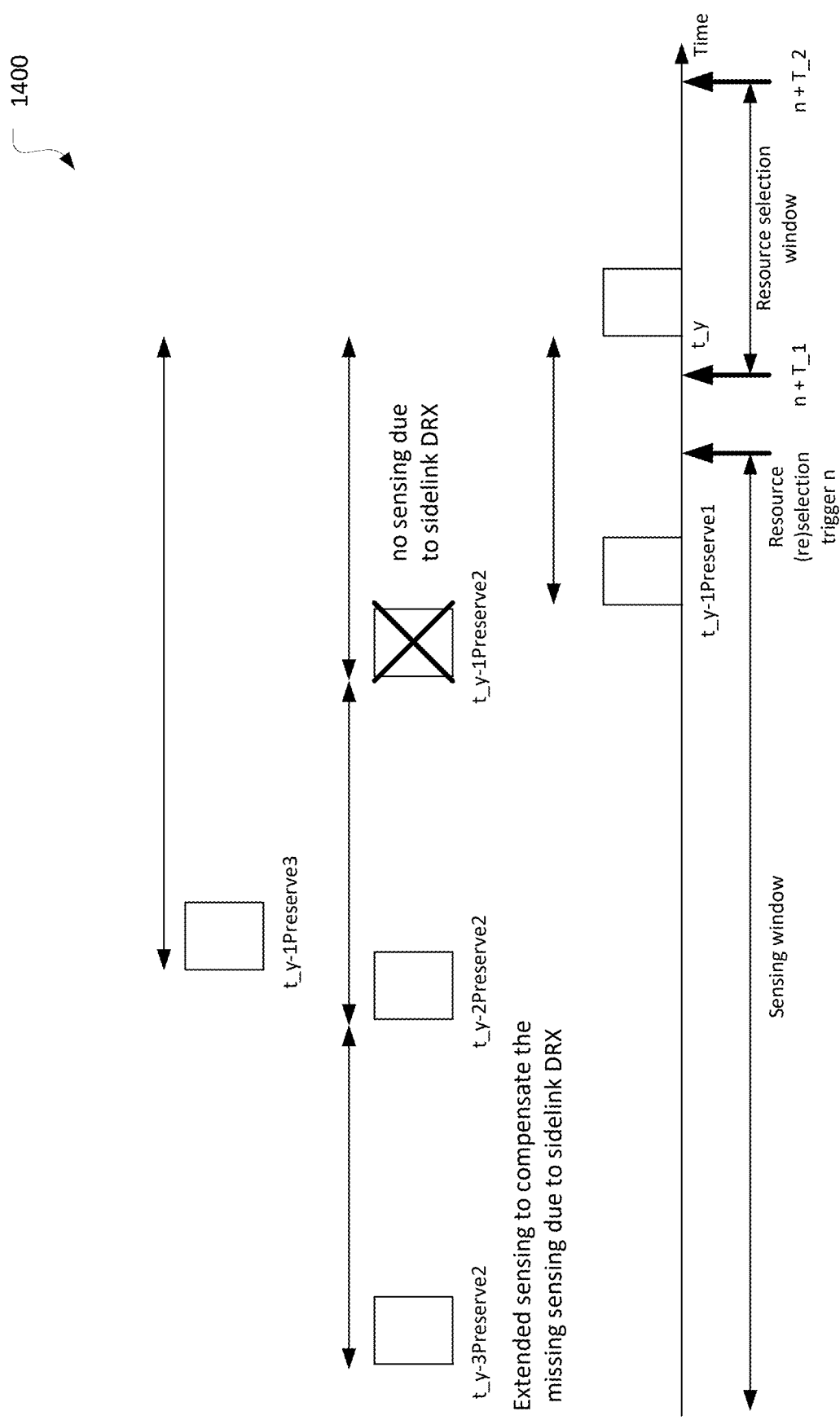
FIG. 14 is an operational diagram to illustrate enhanced periodic-based partial sensing in accordance with some aspects.

FIG. 14 is an operational diagram 1400 to illustrate enhanced periodic-based partial sensing in accordance with some embodiments. In periodic-based partial sensing, as introduced above, a periodic sensing occasion may be a set of slots according to $t_{y-k*P_{reserve}}^{SL}$, if $t_y^{SL}$ is included in the set of Y candidate slots.

In some embodiments, periodic sensing may be extended due to sidelink DRX. For example, for a given k, if a UE does not perform channel sensing on a periodic sensing occasion due to sidelink DRX, then the value of k can be extended.

Referring to FIG. 14, a UE may be unable to perform any sensing in a first sensing occasion of P_reserve2 due to an overlapping sidelink DRX off duration. Thus, in this embodiment k may be extended from two to three to include an additional sensing occasion.

The extended sensing occasion may be upper bounded by a sensing window (n−T_0, n). In some embodiments, more than one sensing occasion may be extended due to a missing sensing occasion from a sidelink DRX configuration.

Figure 15:
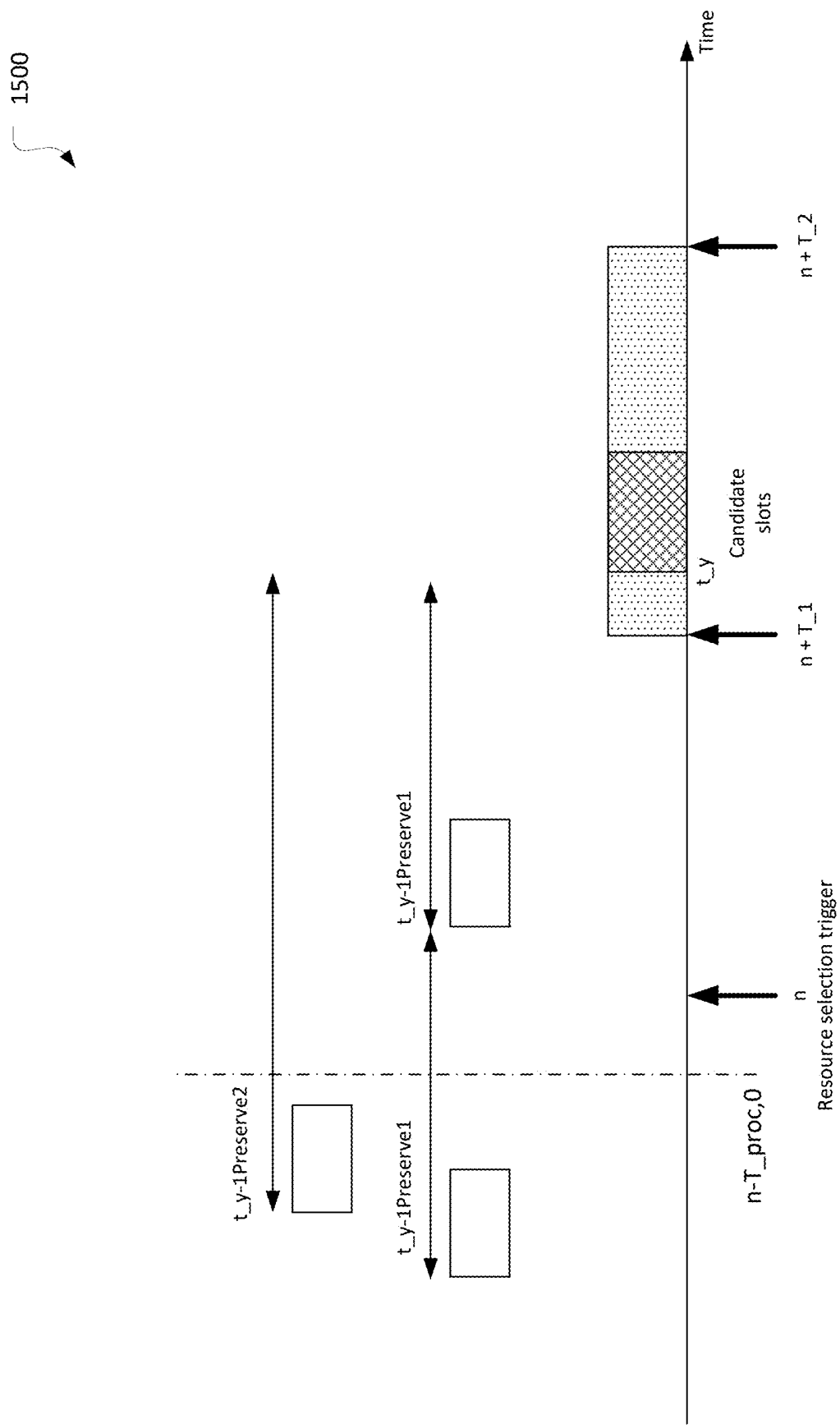
FIG. 15 is an operational diagram to illustrate enhanced periodic-based partial sensing in accordance with some aspects.
Figure 16:
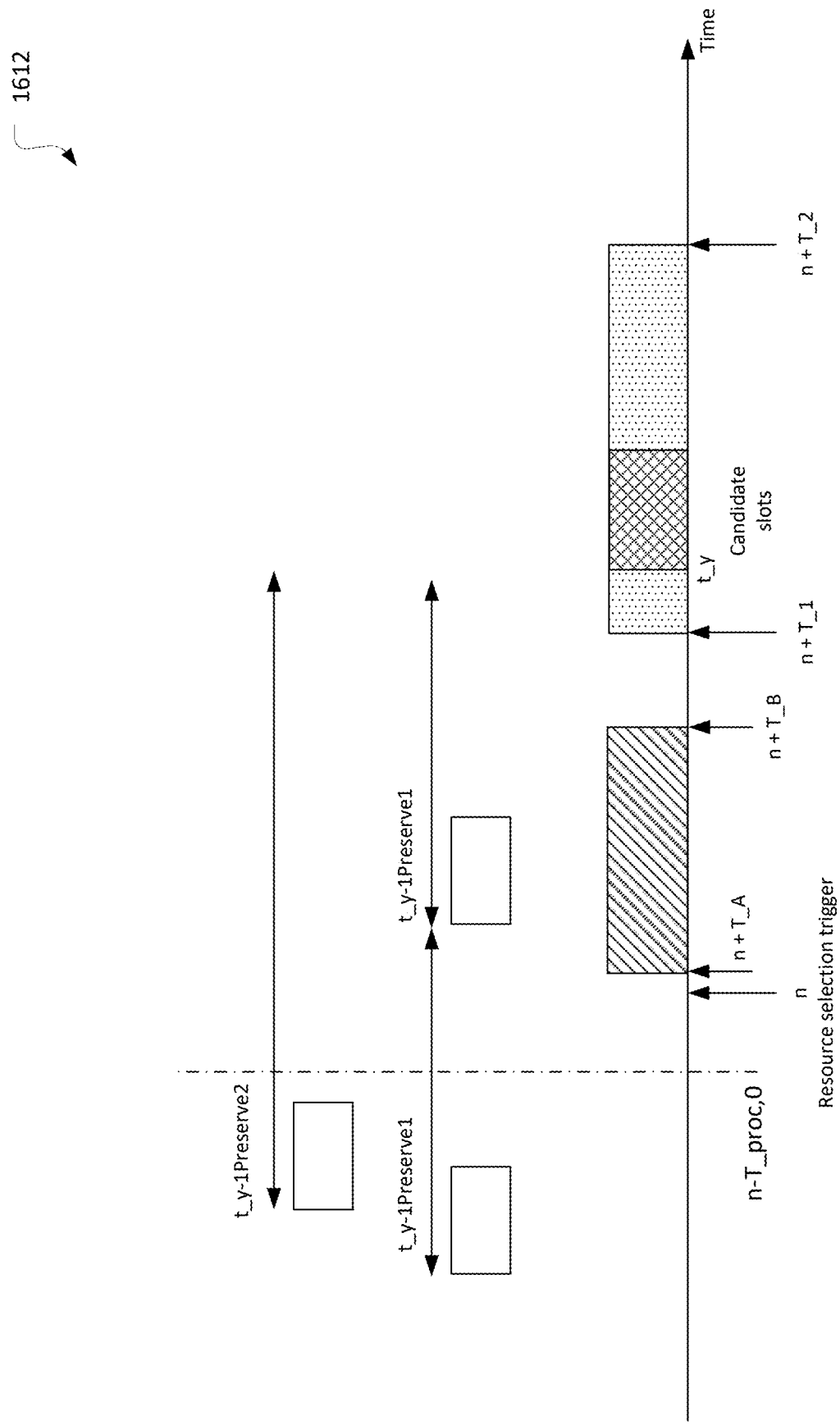
FIG. 16 is an operational diagram to illustrate enhanced periodic-based partial sensing in accordance with some aspects.

Periodic-based partial sensing may be enhanced by properly determining K_i and P_reserve,i. FIGS. 15 and 16 describe examples of determining these parameters.

FIG. 15 is an operational diagram 1500 to illustrate enhanced periodic-based partial sensing in accordance with some embodiments. The operational diagram 1500 shows a scenario in which no contiguous partial sensing is performed at the UE. In this case, if P_reserve,i<t_y−(n−T_proc,0), then K_i may be set to the smallest k such that k*P_reserve, i>t_y−(n−T_proc,0). Similar to that described above, T_proc,0 may be a sensing results processing time. In some embodiments, the sensing results processing time may be ignored. t_y may be a first candidate slot.

FIG. 16 is an operational diagram 1600 to illustrate enhanced periodic-based partial sensing in accordance with some embodiments. The operational diagram 1600 shows a scenario in which contiguous partial sensing within [n+T_A, n+T_B] is performed along with the periodic-based partial sensing. Two options may be used to determine K_i and P_reserve,i in the scenarios.

In a first option, if t_y−k*P_reserve,i∈[n+T_A, n+T_B] for some integer k, then P_reserve,i may be ignored, or K_i may be the smallest k such that t_y−k*P_reserve,i<min{n+T_A, n−T_proc,0}.

In a second option, P_reserve,i may be ignored if it is a subset of sl-ResourceReservePeriodList whose value is smaller than a threshold. The threshold may be preconfigured (for example, 31 or 32 slots) or may depend on contiguous partial sensing window (for example, T_B−T_A).

In some embodiments the UE may not perform sensing, but may randomly select resources based on the following.

If more than one resource is selected for a single TB, then a time gap between a first selected resource and a second selected resource may be large. This may allow other full/partial sensing UEs to detect the resource reservation by the UE not performing the sensing. The full/partial sensing UEs may then reselect new resources to avoid collision.

In some embodiments, the time gap may be larger than a threshold that is (pre-) configured by resource pool or depends on data priority. For example, for a higher data priority, the threshold may be larger. Conversely, for lower priority data, the threshold may be smaller.

In some embodiments, a time gap offset may be applied. For example, a time gap may be set equal to a time gap offset plus a time gap indicated in SCI stage 1. The time gap offset may be (pre-)configured by resource pool or made depend on data priority.

In some embodiments, a similar time gap may or may not apply to a second selected resource and a third selected resource. For example, a different time gap threshold or different time gap offset may be applied.

Figure 17:
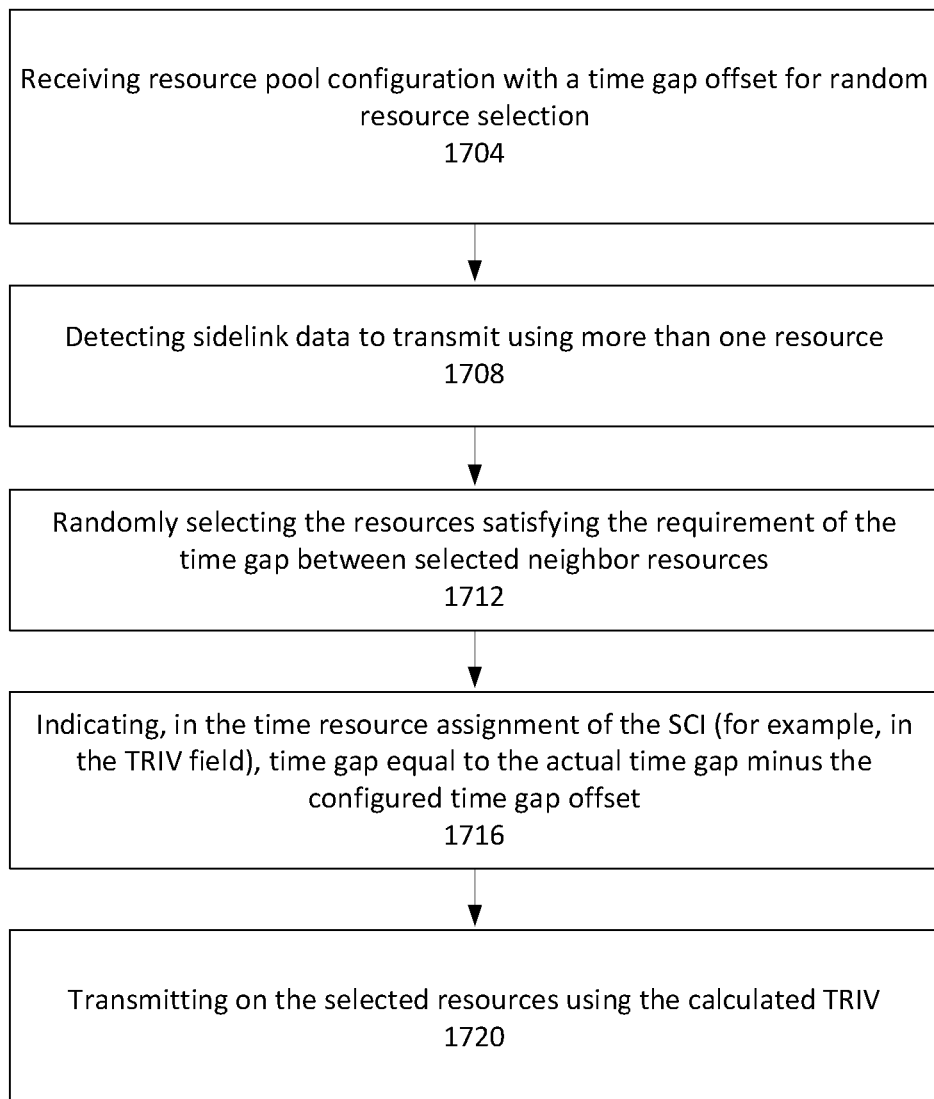
FIG. 17 illustrates an operational flow/algorithmic structure in accordance with some aspects.

FIG. 17 illustrates an operational flow/algorithmic structure 1700 in accordance with some embodiments. The operational flow/algorithmic structure 1700 may be used by a Tx UE to randomly select resources. The operational flow/algorithmic structure 1700 may be implemented by a UE such as, for example, UEs 102, 104, 106, or 2700 or components thereof, for example, baseband circuitry 2704A.

The operation flow/algorithmic structure 1700 may include, at 1704, receiving resource pool configuration with a time gap offset for random resource selection.

The operation flow/algorithmic structure 1700 may further include, at 1708, detecting sidelink data to transmit using more than one resource.

The operation flow/algorithmic structure 1700 may further include, at 1712, randomly selecting resources satisfying the requirement of the time gap between selected neighbor resources.

The operation flow/algorithmic structure 1700 may further include, at 1716, indicating, in the time resource assignment of the SCI (for example, in the time resource indication (TRIV) field), a time gap equal to the actual time gap minus the configured time gap offset.

The operation flow/algorithmic structure 1700 may further include, at 1720, transmitting on the selected resources using the calculated TRIV.

Figure 18:
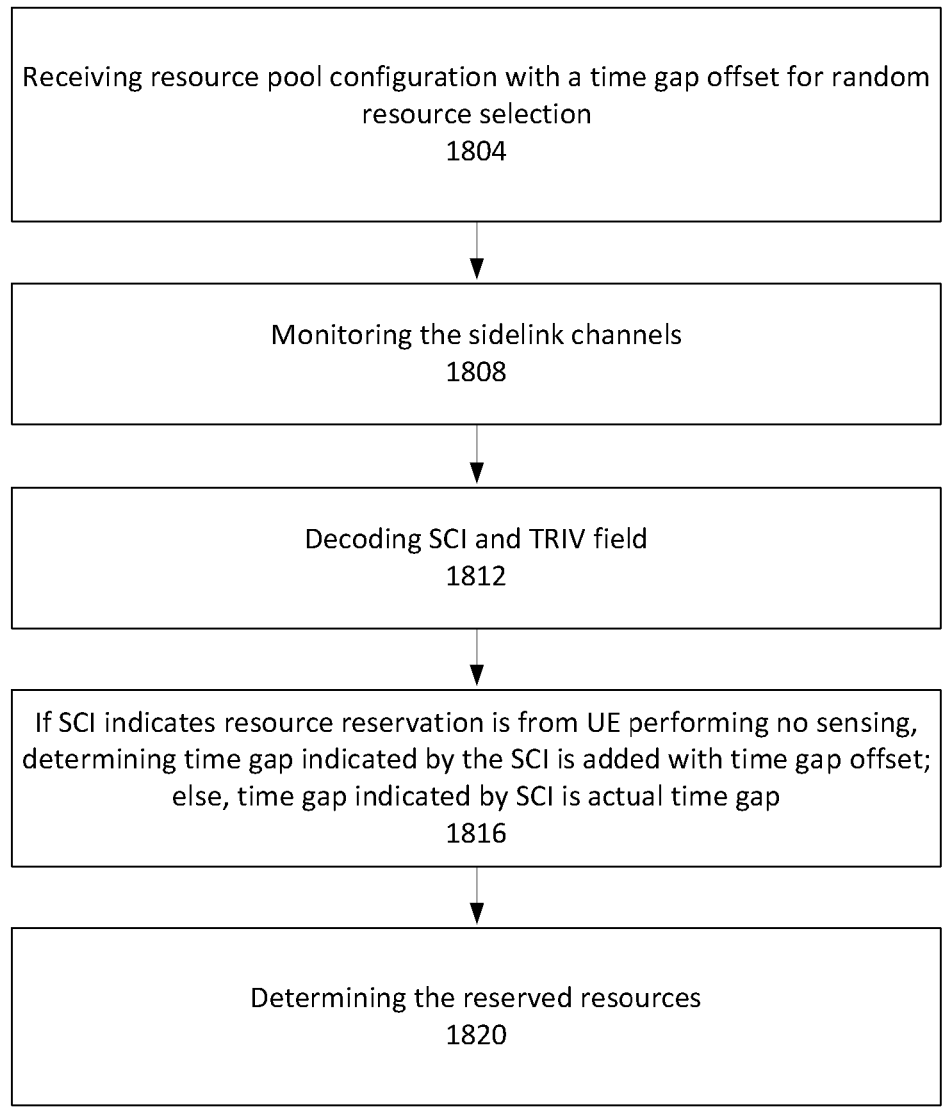
FIG. 18 illustrates an operational flow/algorithmic structure in accordance with some aspects.

FIG. 18 illustrates an operational flow/algorithmic structure 1800 in accordance with some embodiments. The operational flow/algorithmic structure 1800 may be used by a Rx UE to sense resources. The operational flow/algorithmic structure 1800 may be implemented by a UE such as, for example, UEs 102, 104, 106, or 2700 or components thereof, for example, baseband circuitry 2704A.

The operation flow/algorithmic structure 1800 may include, at 1804, receiving resource pool configuration with a time gap offset for random resource selection.

The operation flow/algorithmic structure 1800 may further include, at 1808, monitoring the sidelink channels.

The operation flow/algorithmic structure 1800 may further include, at 1812, decoding SCI and the TRIV field.

If the SCI indicates a resource reservation is from a UE performing no sensing, the operation flow/algorithmic structure 1800 may further include determining a time gap indicated by the SCI is added with a time gap offset at 1816. Else, the time gap indicated by the SCI may be the actual time gap.

The operation flow/algorithmic structure 1800 may further include, at 1820, determining the reserved resources. The UE may then detect the data transmitted in the reserved resources.

Some embodiments describe processes to avoid an infinite loop in resource selection. When a UE determines a candidate set of resources, the UE is supposed to identify at least M*|S_M| candidate resources, wherein S_M is the set of all resources in the resource selection window. If the number of identified candidate resources is less than M*|S_M|, then another loop is performed with an increase in the RSRP threshold. An infinite loop may be possible due to small resource reservation periods (for example, 1-99 ms) allowed in NR V2X. If the UE does not monitor the channel at a slot, then in a slot that is extended from the non-monitored slot by an integer number of periods from the set of configured resource reservation periods are all excluded from the candidate resource set.

Figure 19:
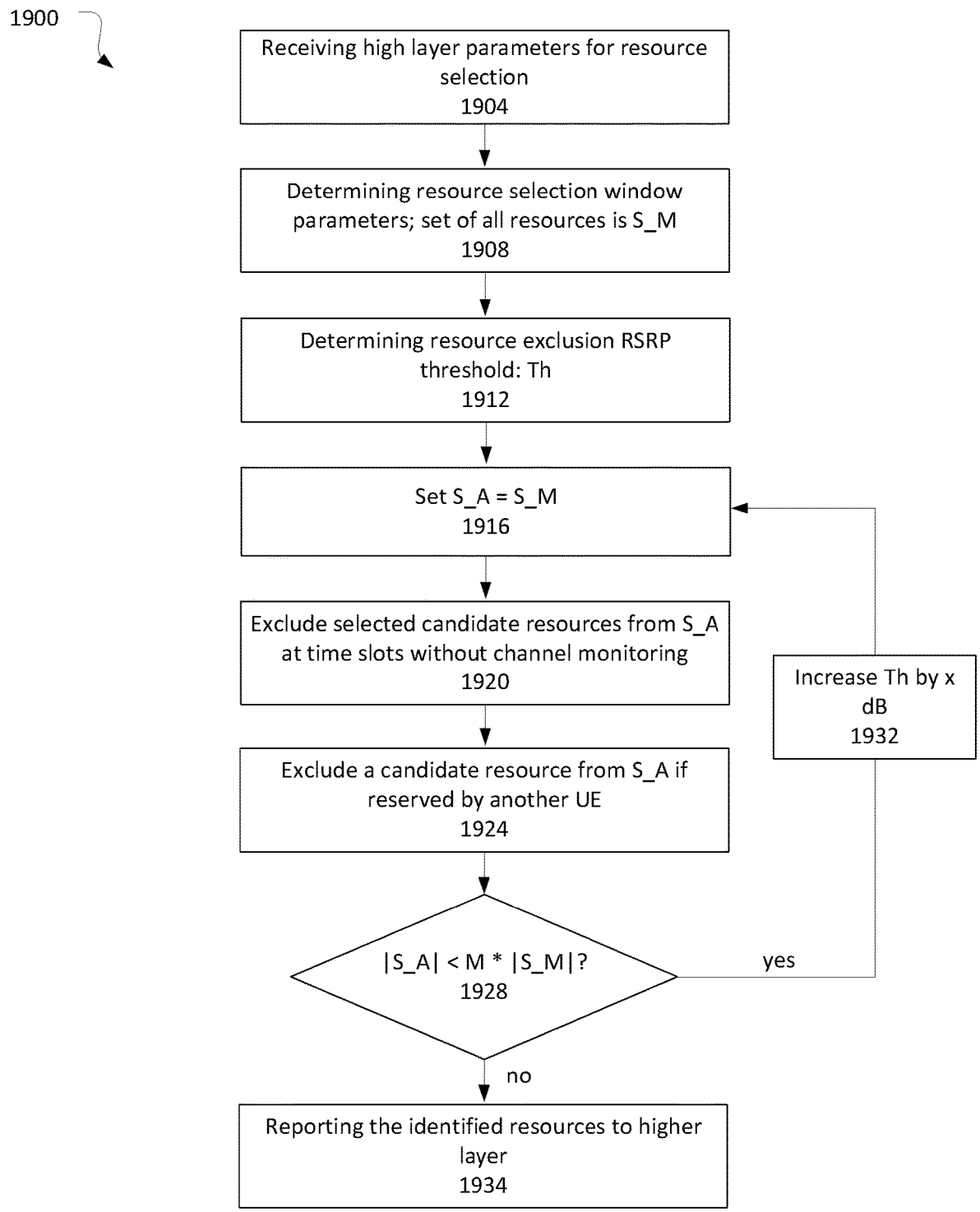
FIG. 19 illustrates an operational flow/algorithmic structure in accordance with some aspects.

FIG. 19 illustrates an operational flow/algorithmic structure 1900 in accordance with some embodiments. The operational flow/algorithmic structure 1900 may be used select resources for sidelink transmission. The operational flow/algorithmic structure 1900 may be implemented by a UE such as, for example, UEs 102, 104, 106, or 2700 or components thereof, for example, baseband circuitry 2704A.

The operation flow/algorithmic structure 1900 may include, at 1904, receiving higher layer parameters for resource selection.

The operation flow/algorithmic structure 1900 may further include, at 1908, determining resource selection window parameters a set of all resources may be referred to as S_M.

The operation flow/algorithmic structure 1900 may further include, at 1912, determining a resource exclusion RSRP threshold (Th).

The operation flow/algorithmic structure 1900 may further include, at 1916, setting S_A to S_M. S_A may correspond to the candidate resource set.

The operation flow/algorithmic structure 1900 may further include, at 1920, excluding candidate resources from S_A at timeslots without channel monitoring. Instead of excluding all candidate resources from S_A at timeslots without channel monitoring, embodiments may exclude only selected candidate resources. For example, embodiments may exclude a slot from a candidate resource set if it is extended from a non-monitored slot by only a single period or a configured number of periods from the set of configured resource reservation periods. In some embodiments, this exclusion rule may only be used if the remaining candidate resources is smaller than $M*|S\_M|$.

The operation flow/algorithmic structure 1900 may further include, at 1924, excluding a candidate resource from S_A if it is reserved by another UE. This may be done with reference to the exclusion RSRP threshold.

The operation flow/algorithmic structure 1900 may further include, and 1928, determining whether $|S\_A|<M*|S\_M|$. If so, the operation flow/algorithmic structure 1900 may advance to increasing Th by x dB at 1932. The value x may be 3 in some embodiments. If not, the operation flow/algorithmic structure 1900 may advance to reporting the identified resources to a higher layer.

Figure 20:
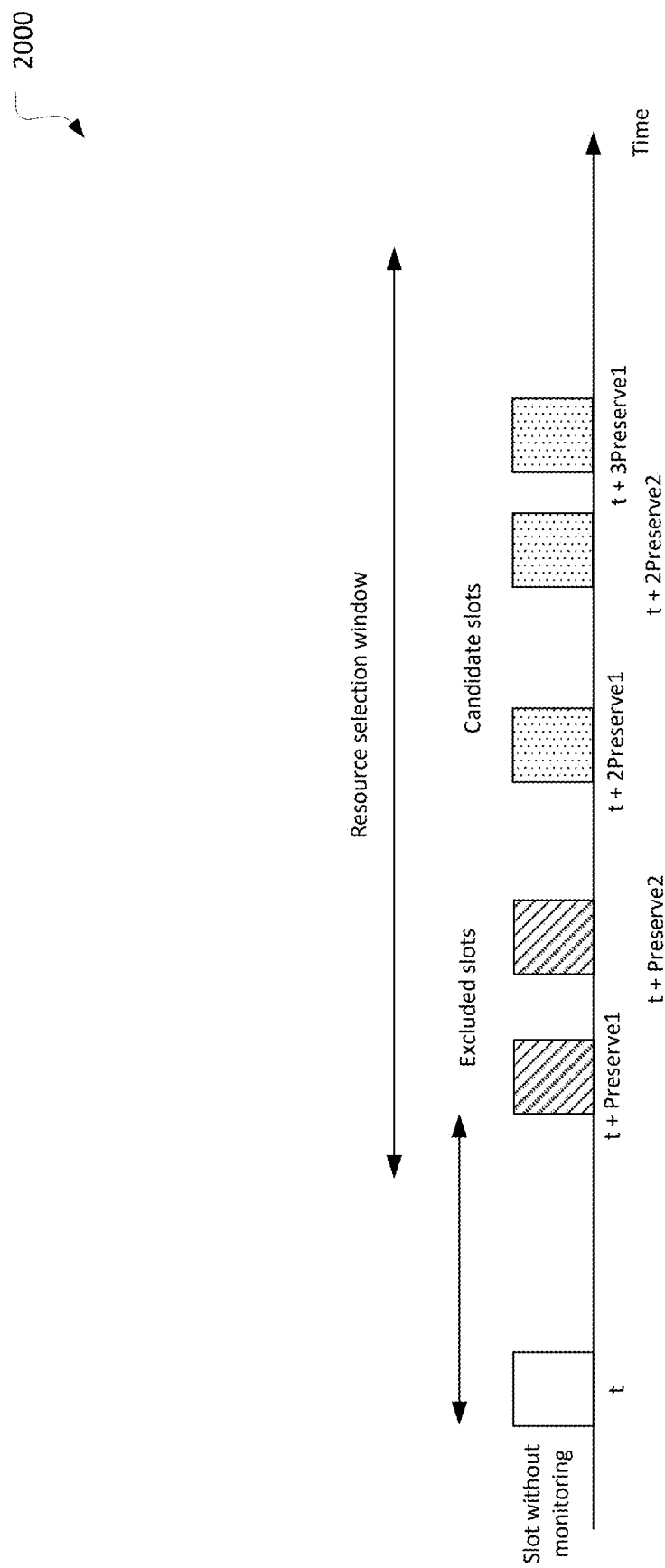
FIG. 20 is an operational diagram that illustrates the exclusion principles described above with respect to FIG. 19 in accordance with some embodiments.

FIG. 20 is an operational diagram 200 that illustrates the exclusion principles described above with respect to FIG. 19 in accordance with some embodiments. For a given slot without monitoring at t, and with the configured resource reservation periods including P_reserve1 and P_reserve2, instead of excluding all occurrences of sensing occasions with P_reserve1/P_reserve2, only a first occurrence may be excluded. Others may be included within the candidate resource set.

Section 8.1.4 of 3GPP TS 38.214 describe the UE procedure for determining the subset of resources to be reported to higher layers in PSSCH resource selection in the sidelink resource allocation mode 2. To accommodate the exclusion principles described above, this section may be amended to include the underlined portion as follow:

The UE shall exclude any candidate single-slot resource R_x,y from the set S_A if it meets all the following conditions:—the UE has not monitored slot $t'^{SL}_m$ in Step 2.—for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 with Q=1 would be met.

Embodiments also provide partial sensing for resource reevaluation and preemption.

Figure 21:
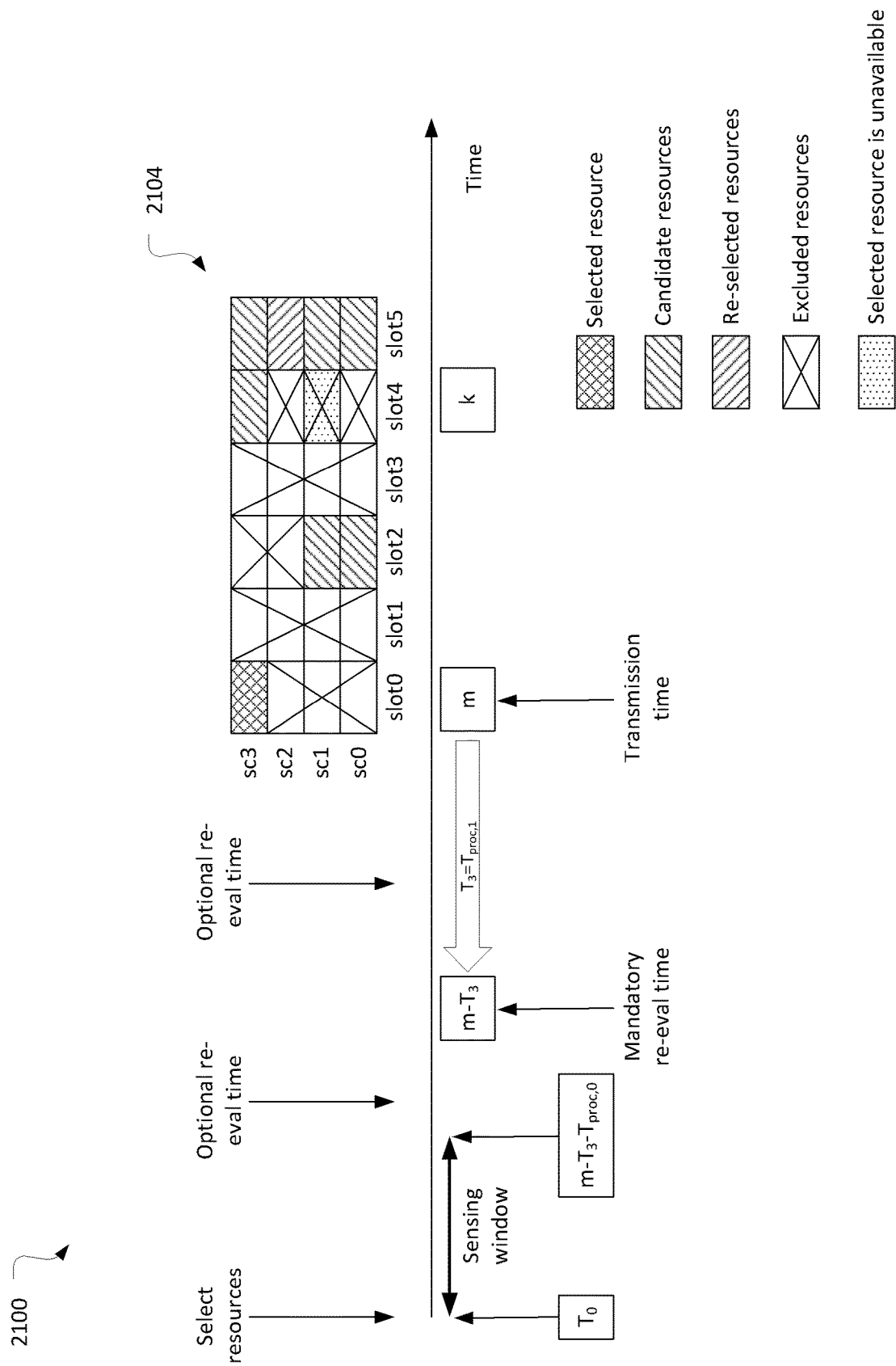
FIG. 21 illustrates a resource reevaluation in accordance with some aspects.

FIG. 21 illustrates a resource reevaluation 2100 in accordance with some aspects. The resource reevaluation 2100 may be conducted before transmission of SCI with reservation. Thus, the resource reevaluation 2100 may be related to the selection of resources before they are reserved.

The resource reevaluation 2100 may be done with respect to a resource pool 2104. The resource pool 2104 is shown as having four subchannels (sc0–sc3) in the frequency domain and six slots (slot0–slot5) in the time domain. In other aspects, the resource pool 2104 may be divided into other numbers of subchannels and slots or divided differently in the time-frequency domain.

Before T_0, the device may monitor the resource pool 204 and determine whether they are candidate resources or excluded resources. The device may then randomly select one or more initial resources from the candidate resources. As shown, the initially selected resources may include a first resource (sc3, slot0) and a second resource (sc1, slot4). For timing purposes, slot 0 may correspond to slot m, while slot 4 may correspond to slot k. At $T_0$, the second resource (sc1, slot4) may be considered an available, candidate resource.

After selection of initial resources at T_0, a device may continue to sense the energy of the resources of the resource pool 204 throughout a sensing window. The sensing window may be at least to m−T_3−T_proc,0 where T_3=T_proc,1, T_proc,0 is a processing time of sensing results, and T_proc,1 is a processing time of preparing sidelink transmissions.

The device may identify the candidate resource set at least by performing a resource reevaluation at m−T_3. Sensing information after the sensing window may not need to be included in the resource reevaluation at m−T_3.

If the initially selected resources are not in the candidate resource set identified at the resource reevaluation, the device may randomly select updated resources from the identified candidate resource set. Thus, through the resource reevaluation, the device may determine whether the initially selected resources have been subsequently reserved by another UE or have otherwise become unavailable. If the device determines through the resource reevaluation that one or more of the initially selected resources have become unavailable, it may reselect a corresponding one or more resources. For example, as shown, the device may determine that the selected resource (sc1, slot4) has become unavailable (by being reserved by UE with higher priority data) and may reselect a resource in the following slot, for example, resource (sc2, slot5).

The device may also perform one or more optional reevaluations before or after the mandatory reevaluation at m−T_3. Whether the device performs these optional reevaluations may depend on device implementation or configuration.

In some aspects, if, after m−T_3, a device detects that an initially selected resource is not in the candidate resource set a resource reselection may not be required.

At a transmission time, corresponding to slot m, a UE may transmit in the first selected resource, for example, resource (sc3, slot0). The transmission may include SCI that also reserves the re-selected resource, for example, resource (sc2, slot5).

Some embodiments describe how to utilize reduced sensing schemes for resource reevaluation and preemption; and how to determine a sensing scheme for resource reevaluation and preemption. While some of the embodiments are described with respect to resource reevaluation, similar concepts may also be applied to resource preemption.

Figure 22:
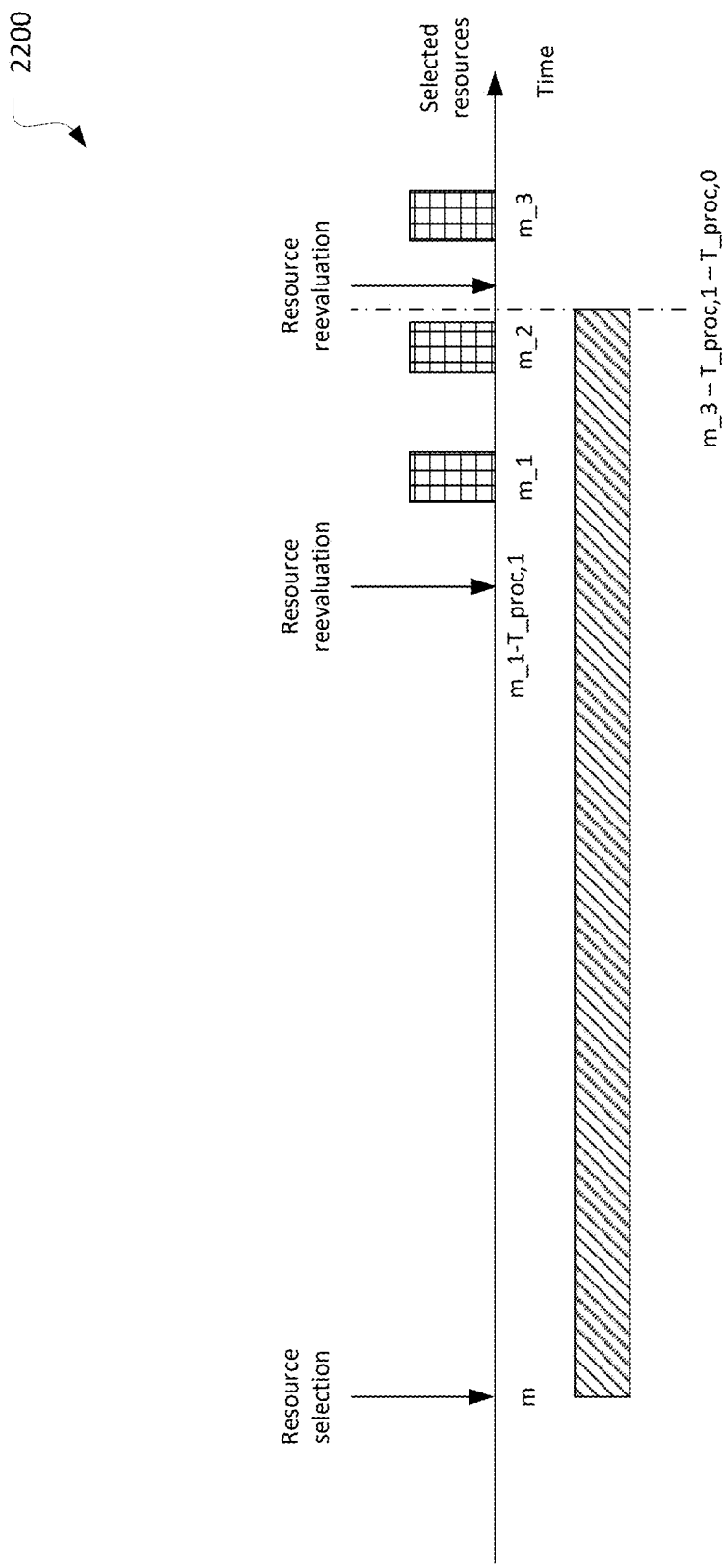
FIG. 22 is an operational diagram the describes a full sensing scheme for resource reevaluation in accordance with some embodiments.

FIG. 22 is an operational diagram 2200 the describes a full sensing scheme for resource reevaluation in accordance with some embodiments.

Resource selection may be performed at slot m, with the selected resources being in slots m_1, m_2, and m_3. Slots m_1, m_2, and m_3 may be ordered in time such that m_1<m_2<m_3. The resource reevaluation may be performed at m_i−T_proc,1, where i=1, 2, or 3. The last sensing results usable for resource reevaluation may be at m_3−T_proc,1−T_proc,0. Additional sensing for resource reevaluation may be restricted between m and m_3−T_proc,1−T_proc,0.

In some embodiments, full sensing for resource reevaluation may start at m or m+1 and may end at m_3−T_proc,1−T_proc,0. The same candidate resource set as used in the resource selection procedure may be applied during the resource reevaluation procedure. Alternatively, a reduced candidate resource set (for example, a subset of the candidate resource set used in the resource selection procedure) may be applied during the resource reevaluation procedure.

Figure 23:
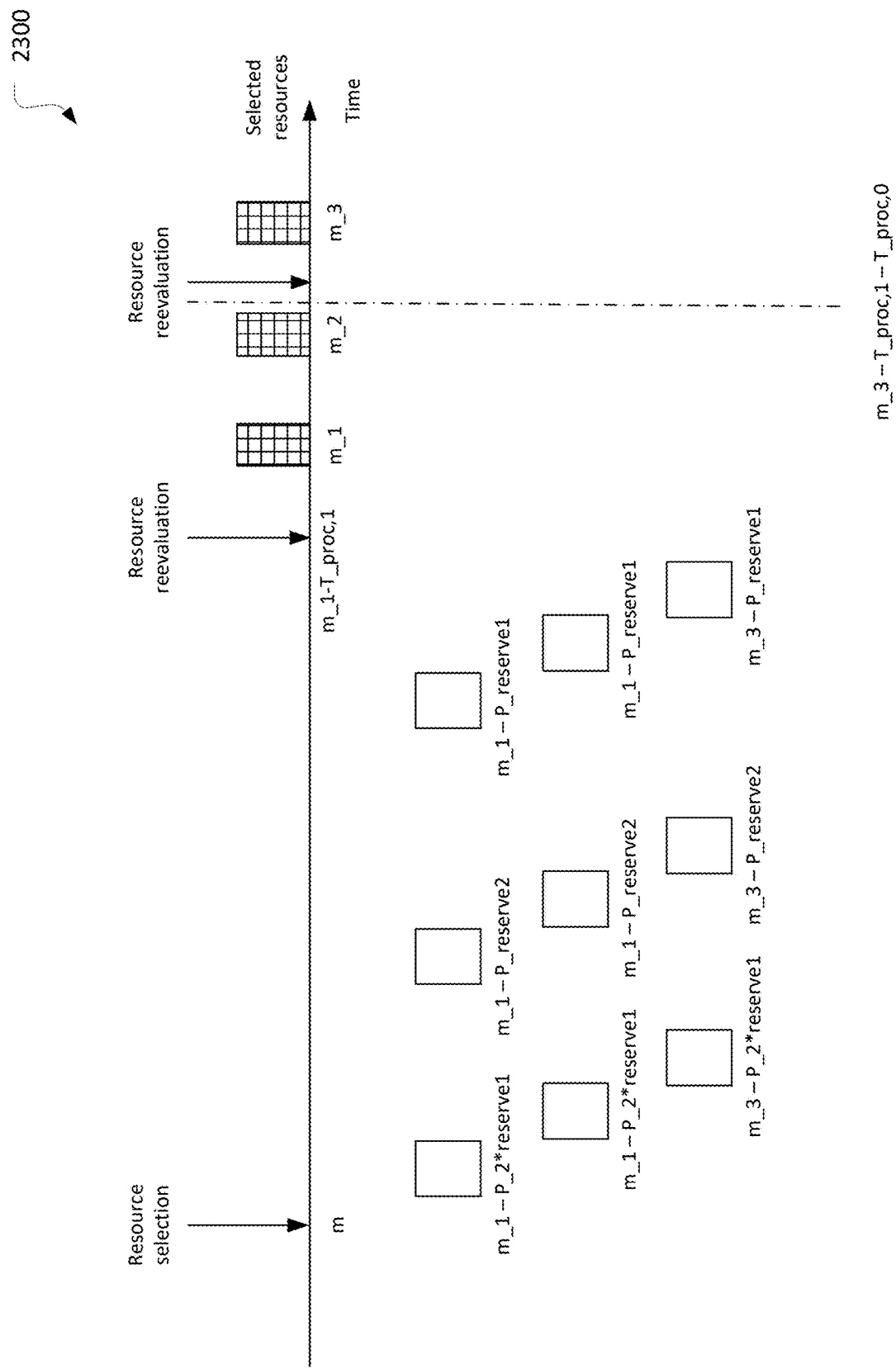
FIG. 23 is an operational diagram that describes only periodic-based partial sensing for resource reevaluation in accordance with some embodiments.

FIG. 23 is an operational diagram 2300 that describes only periodic-based partial sensing for resource reevaluation in accordance with some embodiments.

A periodic-based partial sensing scheme may be applied for resource reevaluation if a resource pool supports partial sensing and configured resource reservation periods (or configured sensing period P_reserve) include non-zero values.

In some embodiments, the sensing occasions may only depend on the selected resources. For each selected resource at m_i, the UE may sense the channel at m_i−k*P_reserve,j, where P_reserve,j is a supported resource reservation period for evaluation (or for resource selection) and k is an integer value that may depend on P_reserve,j.

In the resource reevaluation procedure, the UE may only need to check if the selected resource at m_i is available. If it is not, then another resource at the same slot may be selected.

Figure 24:
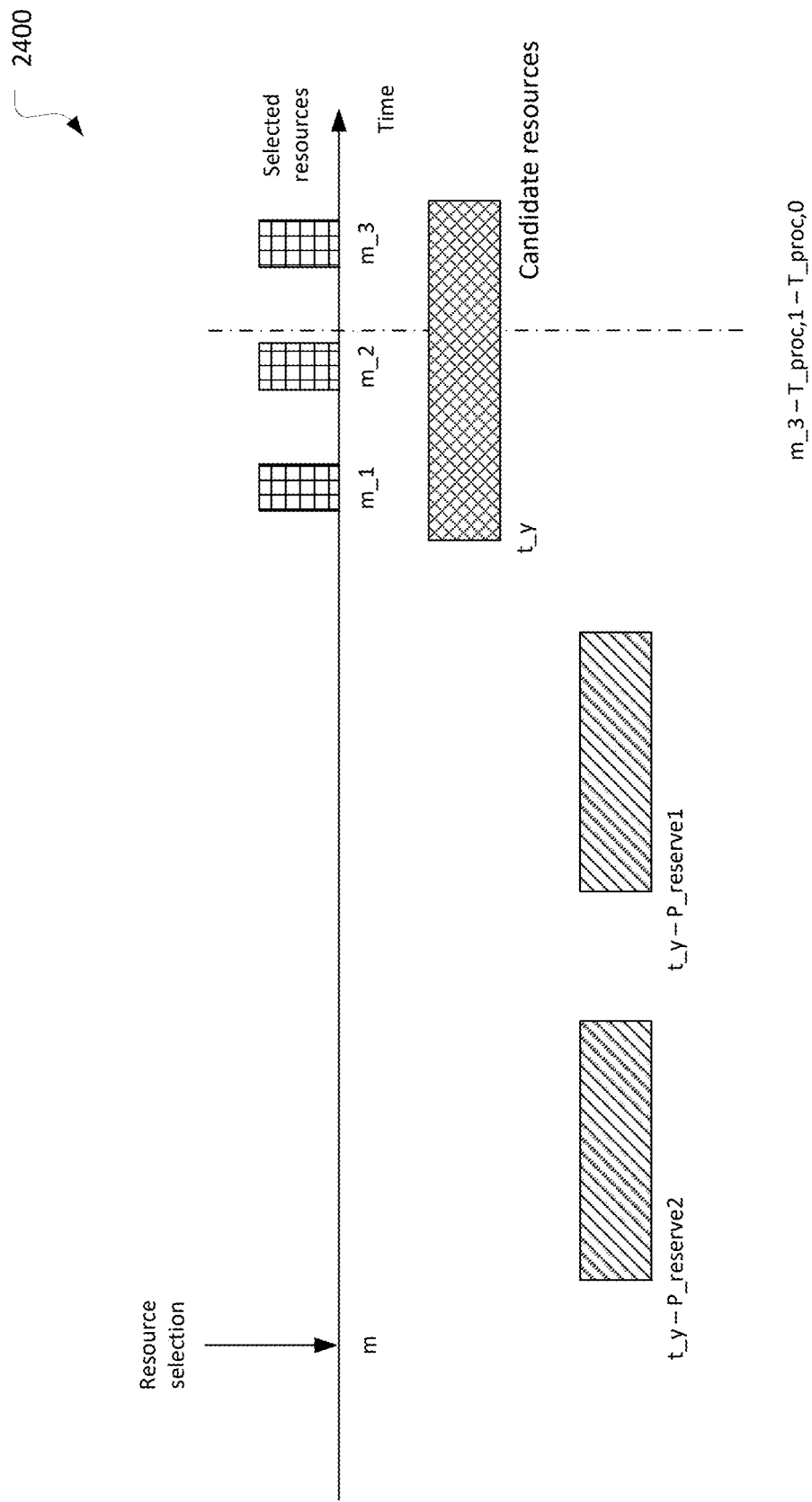
FIG. 24 is an operational diagram that describes only periodic-based partial sensing for resource reevaluation in accordance with some embodiments.

FIG. 24 is an operational diagram 2300 that describes only periodic-based partial sensing for resource reevaluation in accordance with some embodiments.

In this embodiment, the sensing occasions depend on candidate resources. The UE may sense at t_y−k*P_reserve,j, where t_y is a candidate slot (for example, first slot of the candidate resources), P_reserve,j is a supported resource reservation period for resource selection, and k is an integer value that may depend on P_reserve,j.

Figure 25:
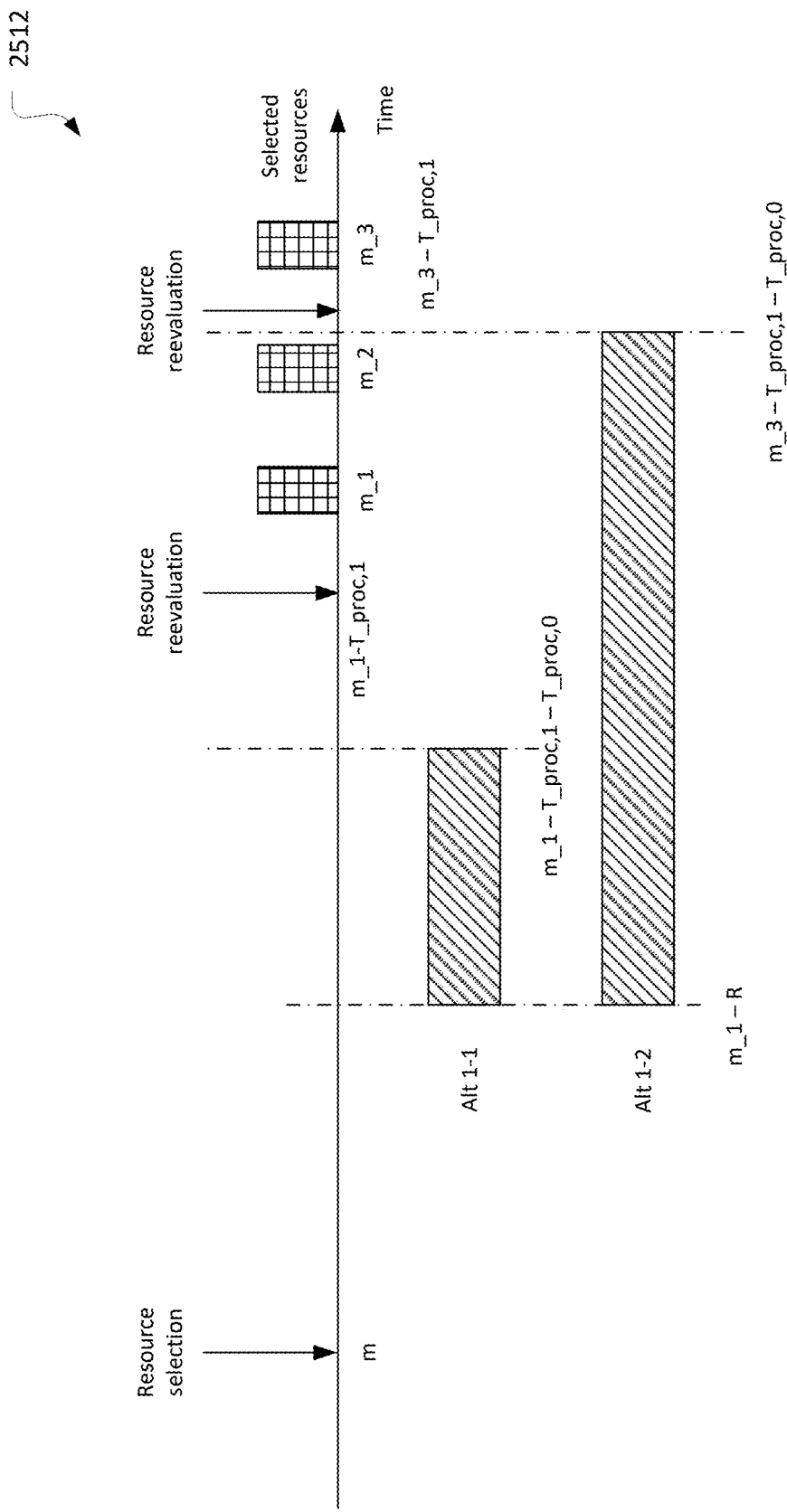
FIG. 25 is an operational diagram that describes only contiguous partial sensing for resource reevaluation in accordance with some embodiments.

FIG. 25 is an operational diagram 2500 that describes only contiguous partial sensing for resource reevaluation in accordance with some embodiments. In this embodiment, the contiguous partial sensing may be based on one or more selected resources. This embodiment may be applied if periodic-based partial sensing is not used in resource selection.

The UE may start the contiguous partial sensing at m_1−R, where R is a resource reservation window that may be, for example, 31 or 32 slots. The contiguous partial sensing may end at m_1−T_proc,1−T_proc,0 (shown in FIG. 25 as Alt 1-1) or at m3−T_proc,1−T_proc,0 (shown in FIG. 25 as Alt 1-2). m_3 may be the last selected resource. For m_1, the contiguous partial sensing window starts at m_1−R and stops at m_1−T_proc, 1−T_proc,0. Here, R is the resource reservation window size (e.g., 32 slots). For m_3, the contiguous partial sensing window starts at m_3−R and stops at m_3−T_proc,1−T_proc,0. The contiguous partial sensing window for m_1 and the contiguous partial sensing window for m_3 may overlap. Specifically, when m_3−R<m_1−T_proc,1−T_proc,0. In this case, the overall sensing window will start at m_1−R and end at m_3−T_proc,1−T_proc,0 as shown in Alt 1-2 in FIG. 25.

Figure 26:
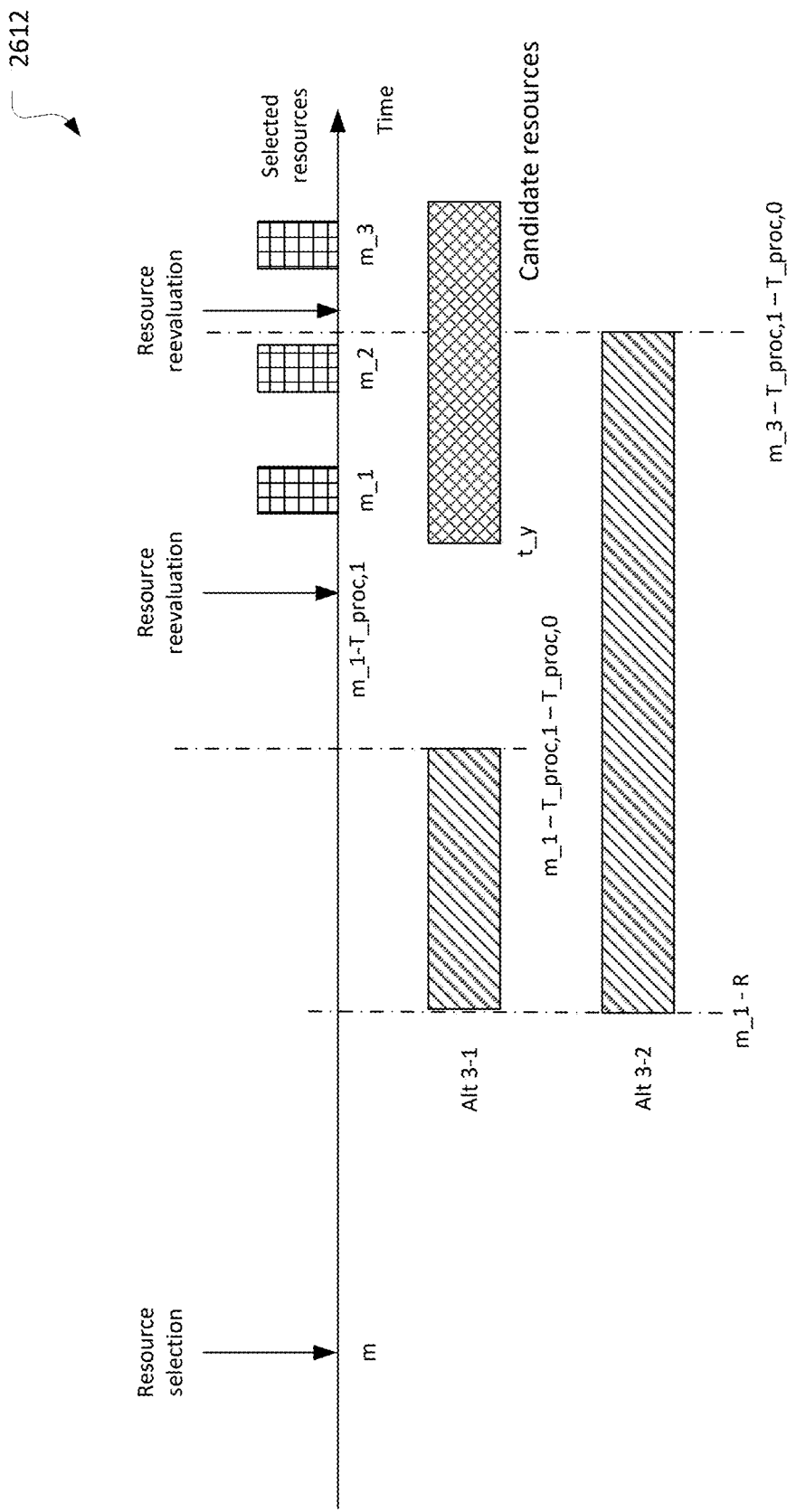
FIG. 26 is an operational diagram that describes only contiguous partial sensing for resource reevaluation in accordance with some embodiments.

FIG. 26 is an operational diagram 2600 that describes only contiguous partial sensing for resource reevaluation in accordance with some embodiments. In this embodiment, the contiguous partial sensing may be for candidate resources. This embodiment may be applied if periodic-based partial sensing is used for resource selection.

The UE may start the contiguous partial sensing at t_y−R, where R is a resource reservation window that may be, for example, 31 or 32 slots. The contiguous partial sensing may end at m_1−T_proc,1−T_proc,0 (shown in FIG. 26 as Alt 3-1) or at m3−T_proc,1−T_proc,0 (shown in FIG. 26 as Alt 3-2).

In some embodiments, both periodic-based partial sensing and contiguous partial sensing may be used for resource reevaluation period. This may be applied if the resource pool supports partial sensing or random resource selection and the configured resource reservation periods (or configured sensing period P_reserve) include both zero and nonzero values.

In some embodiments, no additional sensing may be used for resource reevaluation.

In all the embodiments discussed herein, the sensing results before the resource selection may also be used for resource reevaluation.

Some embodiments describe relationships between sensing for resource selection and sensing for resource reevaluation.

Five sensing schemes may be used for resource selection. These include full sensing (which may be referred to as scheme A), periodic-based partial sensing only (which may be referred to as scheme B), contiguous partial sensing only (which may be referred to as scheme C), both periodic-based partial sensing and contiguous partial sensing (which may be referred to as scheme D), and no sensing, for example, random selection (which may be referred to as scheme E).

Five sensing schemes may also be used for resource reevaluation. These full sensing for resource reevaluation (which may be referred to as scheme 1), periodic-based partial sensing only for resource reevaluation (which may be referred to as scheme 2), contiguous partial sensing only for resource reevaluation (which may be referred to as scheme 3), both periodic-based partial sensing and contiguous partial sensing (which may be referred to as scheme 4), and no additional sensing for resource reevaluation (which may be referred to as scheme 5).

In some embodiments, the sensing scheme used for resource reevaluation may be a one-to-one mapping with the sensing scheme for resource selection. Thus, if a sensing scheme is used for resource selection, then the corresponding scheme is used for resource reevaluation. Scheme 1=>scheme A; scheme 2=>scheme B; scheme 3=>scheme C; scheme 4=>scheme D; and scheme 5=>scheme E.

In some embodiments, the sensing scheme used for resource reevaluation may be a one-to-one or a one-to-many (or a many-to-one) mapping with the sensing scheme for resource selection. For example, scheme 1 can be used with any of schemes A-E; scheme 2 can be used with either of scheme B and E; scheme 3 can be used with either of scheme C and D; scheme 4 can be used with either of scheme D and E; and scheme 5 can be used with scheme E.

Figure 27:
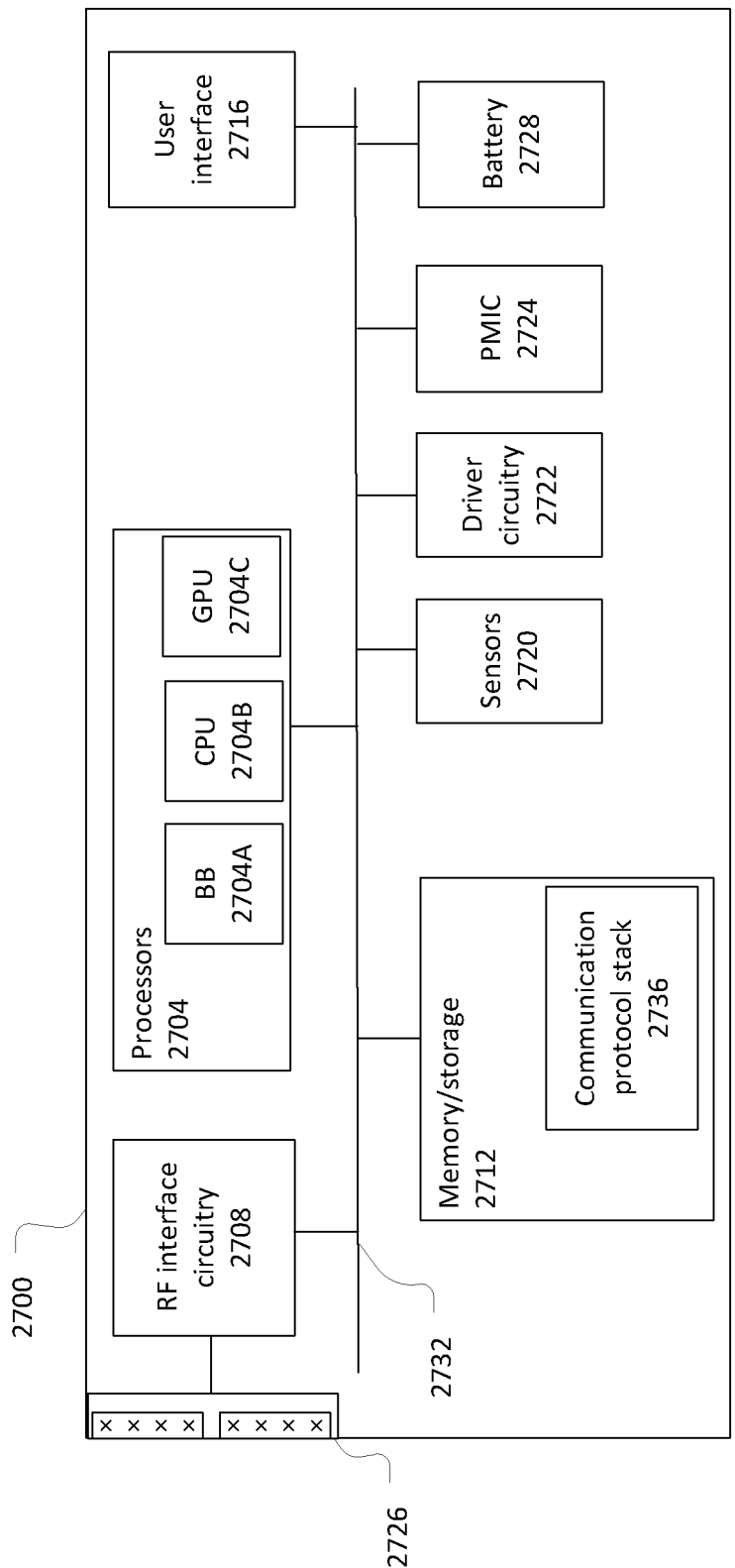
FIG. 27 illustrates a user equipment in accordance with some aspects.

FIG. 27 illustrates a UE 2700 in accordance with some aspects. The UE 2700 may be similar to and substantially interchangeable with UEs 102, 104, or 106.

The UE 2700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 2700 may include processors 2704, RF interface circuitry 2708, memory/storage 2712, user interface 2716, sensors 2720, driver circuitry 2722, power management integrated circuit (PMIC) 2724, antenna structure 2726, and battery 2728. The components of the UE 2700 may be implemented as integrated circuits (ICs), portions thereof, discrete electronic devices, or other modules, logic, hardware, software, firmware, or a combination thereof. The block diagram of FIG. 27 is intended to show a high-level view of some of the components of the UE 2700. However, some of the components shown may be omitted, additional components may be present, and different arrangement of the components shown may occur in other implementations.

The components of the UE 2700 may be coupled with various other components over one or more interconnects 2732, which may represent any type of interface, input/output, bus (local, system, or expansion), transmission line, trace, optical connection, etc. that allows various circuit components (on common or different chips or chipsets) to interact with one another.

The processors 2704 may include processor circuitry such as, for example, baseband processor circuitry (BB) 2704A, central processor unit circuitry (CPU) 2704B, and graphics processor unit circuitry (GPU) 2704C. The processors 2704 may include any type of circuitry or processor circuitry that executes or otherwise operates computer-executable instructions, such as program code, software modules, or functional processes from memory/storage 2712 to cause the UE 2700 to perform operations as described herein.

In some aspects, the baseband processor circuitry 2704A may access a communication protocol stack 2736 in the memory/storage 2712 to communicate over a 3GPP compatible network. In general, the baseband processor circuitry 2704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 2708.

The baseband processor circuitry 2704A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 2712 may include one or more non-transitory, computer-readable media that includes instructions (for example, communication protocol stack 2736) that may be executed by one or more of the processors 2704 to cause the UE 2700 to perform various operations described herein. The memory/storage 2712 may also store configuration, resource pool, or sidelink configuration/communication information as described elsewhere.

The memory/storage 2712 include any type of volatile or non-volatile memory that may be distributed throughout the UE 2700. In some aspects, some of the memory/storage 2712 may be located on the processors 2704 themselves (for example, L1 and L2 cache), while other memory/storage 2712 is external to the processors 2704 but accessible thereto via a memory interface. The memory/storage 2712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2708 may include transceiver circuitry and radio frequency front module (RFEM) that allows the UE 2700 to communicate with other devices over a radio access network. The RF interface circuitry 2708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2726 and proceed to filter and amplify (with a low-noise amplifier) the signal. The signal may be provided to a receiver of the transceiver that down-converts the RF signal into a baseband signal that is provided to the baseband processor of the processors 2704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2726.

In various aspects, the RF interface circuitry 2708 may be configured to transmit/receive signals in a manner compatible with NR access technologies.

The antenna 2726 may include antenna elements to convert electrical signals into radio waves to travel through the air and to convert received radio waves into electrical signals. The antenna elements may be arranged into one or more antenna panels. The antenna 2726 may have antenna panels that are omnidirectional, directional, or a combination thereof to enable beamforming and multiple input, multiple output communications. The antenna 2726 may include microstrip antennas, printed antennas fabricated on the surface of one or more printed circuit boards, patch antennas, phased array antennas, etc. The antenna 2726 may have one or more panels designed for specific frequency bands including bands in frequency ranges 1 and 2.

The user interface 2716 includes various input/output (I/O) devices designed to enable user interaction with the UE 2700. The user interface 2716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 2700.

The sensors 2720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2722 may include software and hardware elements that operate to control particular devices that are embedded in the UE 2700, attached to the UE 2700, or otherwise communicatively coupled with the UE 2700. The driver circuitry 2722 may include individual drivers allowing other components to interact with or control various input/output (I/O) devices that may be present within, or connected to, the UE 2700. For example, driver circuitry 2722 may include a display driver to control and allow access to a display device, a touchscreen driver to control and allow access to a touchscreen interface, sensor drivers to obtain sensor readings of sensor circuitry 2720 and control and allow access to sensor circuitry 2720, drivers to obtain actuator positions of electro-mechanic components or control and allow access to the electro-mechanic components, a camera driver to control and allow access to an embedded image capture device, audio drivers to control and allow access to one or more audio devices.

The PMIC 2724 may manage power provided to various components of the UE 2700. In particular, with respect to the processors 2704, the PMIC 2724 may control power-source selection, voltage scaling, battery charging, or DC-to-DC conversion.

A battery 2728 may power the UE 2700, although in some examples the UE 2700 may be mounted deployed in a fixed location, and may have a power supply coupled to an electrical grid. The battery 2728 may be a lithium ion battery, a metal-air battery, such as a zinc-air battery, an aluminum-air battery, a lithium-air battery, and the like. In some implementations, such as in vehicle-based applications, the battery 2728 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a user equipment (UE), the method comprising: receiving configuration information for a resource pool; determining a type of traffic to be transmitted by the UE, the type to include aperiodic traffic or periodic traffic; determining, based on the configuration information and traffic type, first and second values to define a window for contiguous partial sensing; and performing contiguous partial sensing within the window.

Example 2 includes the method of example 1 or some other example herein, wherein the type includes aperiodic traffic, the configuration information includes configured resource reservation periods having a zero value, and determining the first and second values comprises: determining, based on the configured resource reservation periods having the zero value, that the first and second values are nonnegative values.

Example 3 includes the method of example 2 or some other example herein, wherein the first value is zero or one and the second value is equal to R or (R−T_proc,0), where R is a length of a resource reservation window and T_proc,0 is a number of slots required by the UE to process sensing results.

Example 4 includes the method of example 1 or some other example herein, wherein the type includes periodic traffic, the configuration information includes configured resource reservation period having a zero value, and determining the first and second values comprises: determining the first values is −R or (−R−T_proc,0); and determining the second value is 0 or −T_proc,0, where R is a length of a resource reservation window and T_proc,0 is a number of slots required by the UE to process sensing results.

Example 5 includes the method of example 4 or some other example herein, wherein the length of the resource reservation window is 31 or 32 slots.

Example 6 includes the method of example 1 or some other example herein, wherein the type includes aperiodic traffic, the configuration information includes configured resource reservation periods having both zero and non-zero values, and determining the first and second values comprises determining the first value is max{0,t_y−R} or max{1,t_y−R}; and determining the second value is max{first value, t_y−T_proc_0} or max {first value, t_y−T_proc_0−T_proc_1}, where the first value and the second value are nonnegative values, t_y is candidate slots in a resource selection window, T_proc_0 is a number of slots required by the UE to process sensing results, and T_proc_1 is a number of slots required by the UE to prepare a physical sidelink control channel (PSCCH) or a physical sidelink shared channel (PSSCH) transmission.

Example 7 includes the method of example 1 or some other example herein, wherein the type includes periodic traffic, the configuration information includes configured resource reservation periods having both zero and non-zero values, and determining the first and second values comprises determining the first value is t_y−R; and determining the second value is t_y−T_proc_0 or t_y−T_proc_0−T_proc_1, where t_y is candidate slots in a resource selection window, T_proc_0 is a number of slots required by the UE to process sensing results, and T_proc_1 is a number of slots required by the UE to prepare a physical sidelink control channel (PSCCH) or a physical sidelink shared channel (PSSCH) transmission.

Example 8 includes the method of example 1 or some other example herein, further comprising: determining the first and second values based on a remaining packet delay budget of data to be transmitted by the UE.

Example 9 includes the method of example 8 or some other example herein, further comprising: determining the first and second values to provide a time gap between the second value or the first value and the remaining PDB is greater than a preconfigured threshold.

Example 10 includes the method of example 9 or some other example herein, further comprising: determining the preconfigured threshold based on the configuration information.

Example 11 includes the method of example 1 or some other example herein, further comprising: determining the first and second values based on a priority of data to be transmitted, a power or battery capability of the UE, or a power or battery level of the UE.

Example 12 includes the method of example 1 or some other example herein, further comprising: determining the second value is less than or equal to T_2,min−thresh, where T_2,min is a configured minimum value for a resource selection window parameter for a data priority and thresh is a preconfigured threshold.

Example 13 includes the method of example 1 or some other example herein, wherein the type is periodic traffic and the method further comprises: determining the first and second values based on a periodicity of the traffic.

Example 14 includes the method of example 1 or some other example herein, further comprising: determining a channel busy ratio; and determining the first and second values based the channel busy ratio.

Example 15 includes the method of example 1 or some other example herein, wherein the UE is a first UE and the method further comprises: receiving radio resource control (RRC) signaling from a second UE over a PC5 interface; and determining the first and second values based on the RRC signaling.

Example 16 includes a method of operating a user equipment (UE), the method comprising: determining first and second values that define a window for contiguous partial sensing: determining the window overlaps in time with a configured sidelink discontinuous reception (DRX) off duration; and performing the contiguous partial sensing in the window or an updated window.

Example 17 includes the method of example 16 or some other example herein, further comprising: generating the updated window by adding a delta value to the first and second values to align a start of the updated window with a start of a configured sidelink DRX on duration; and performing the contiguous partial sensing in the updated window.

Example 18 includes the method of example 16 or some other example herein, further comprising: detecting, at a media access control layer, a resource selection trigger; generating the updated window to be included within a configured sidelink DRX on duration by delaying a provision of the resource selection trigger to a physical layer; and performing the contiguous partial sensing in the updated window.

Example 19 includes the method of example 16 or some other example herein, further comprising: generating the updated window by adding a delta value to the first and second values to align an end of the updated window with an end of the sidelink DRX off duration; and performing the contiguous partial sensing in the updated window.

Example 20 includes the method of example 19 or some other example herein, wherein performing the contiguous partial sensing in the updated window is independent of a resource selection trigger.

Example 21 includes the method of example 16 or some other example herein, further comprising: determining that the window overlaps in time with a configured DRX on duration; generating the updated window by adding a delta value to only the first value of the first and second values to align a start of the updated window with a start of the configured sidelink DRX on duration; and performing the contiguous partial sensing in the updated window.

Example 22 includes the method of example 16 or some other example herein, further comprising: reconfiguring the sidelink DRX off duration and a sidelink DRX on duration to include the window in the sidelink DRX on duration; and performing the contiguous partial sensing in the window.

Example 23 includes the method of example 16 or some other example herein, further comprising: generating the updated window by adding a delta value to only the second value of the first and second values to align an end of the updated window with an end of the configured sidelink DRX off duration; and performing the contiguous partial sensing in the updated window.

Example 24 includes a method of operating a user equipment (UE), the method comprising: determining a number of resources to be selected for a transmit block on a sidelink channel; determining a minimum number of candidate slots within a resource selection window based on the number of resources or a sidelink discontinuous reception (DRX) configuration; performing periodic-based partial sensing in a sensing window; and selecting a number of candidate slots within the resource selection window, the number of candidates slots equal to or greater than the minimum number of candidate slots.

Example 25 includes the method of example 24 or some other example herein, wherein determining the minimum number of candidate slots is based on the number of resources to be selected.

Example 26 includes the method of example 25 or some other example herein, wherein the number of resources to be selected is one, two, or three slots.

Example 27 includes the method of example 26 or some other example herein, further comprising: determining the minimum number of candidate slots is: a first number if the number of resources to be selected is a second number; a third number if the number of resources to be selected is a fourth number, wherein the third number is greater than the first number and the fourth number is greater than the second number.

Example 28 includes the method of example 24 or some other example herein, wherein the sidelink DRX configuration is configured at a receiving UE, determining the minimum number is based on the sidelink DRX configuration, and the method further comprises: determining the resource selection window is no larger than an on duration of the sidelink DRX configuration.

Example 29 includes the method of example 24 or some other example herein, further comprising: determining a length of the resource selection window; determining the minimum number of candidate slots is: a first number if the length of the resource selection window is a second number; a third number if the length of the resource selection window is a fourth number, wherein the third number is greater than the first number and the fourth number is greater than the second number.

Example 30 includes a method of operating a user equipment (UE), the method comprising: determining a sensing configuration that configures a set of periodic sensing occasions; detecting that a first sensing occasion within the set of periodic sensing occasions is scheduled to occur during a sidelink discontinuous reception (DRX) off duration, after a resource selection trigger, or during a contiguous partial sensing window; and generating a modified set of periodic sensing occasions that does not include the first sensing occasion; and performing sensing within the modified set of periodic sensing occasions.

Example 31 includes the method of example 30 or some other example herein, wherein the modified set includes one or more periodic sensing occasions that are not in the set of periodic sensing occasions.

Example 32 includes the method of example 30 or some other example herein, wherein the modified set includes only periodic sensing occasions in a sensing window that starts T_0 slots before the resource selection trigger and ends at the resource selection trigger.

Example 33 includes the method of example 30 or some other example herein, wherein the first sensing occasion is scheduled to occur after the resource selection trigger.

Example 34 includes the method of example 33 or some other example herein, wherein the sensing configuration includes a P_reserve,i that is less than t_y−(n−T_proc,0), and said generating the modified set includes setting k to a smallest integer that sets k*P_reserve,i to be greater than or equal to t_y−(n−T_proc,0), where P_reserve,i is a periodicity of the set of periodic sensing occasions, t_y is a first candidate slot in a resource selection window, n is a slot in which the resource selection is triggered, T_proc,0 is a time required by the UE to process sensing results, k is a number of periodic sensing occasions in the modified set.

Example 35 includes the method of example 30 or some other example herein, wherein the first sensing occasion is scheduled to occur during the contiguous partial sensing window.

Example 36 includes the method of example 35 or some other example herein, wherein the sensing configuration includes a P_reserve,i that is less than t_y−(n−T_proc,0), and said generating the modified set includes setting k to a smallest integer that sets t_y−k*P_reserve,i to be less than min {n+T_A, n−T_proc,0}, where P_reserve,i is a periodicity of the set of periodic sensing occasions, t_y is a first candidate slot in a resource selection window, n is a slot in which the resource selection is triggered, T_A defines a starting slot of the contiguous partial sensing window with respect to n, T_proc,0 is a time required by the UE to process sensing results, k is a number of periodic sensing occasions in the modified set.

Example 37 includes a method of operating a user equipment (UE), the method comprising: identifying data that is to be transmitted on a sidelink channel; identifying a threshold value; randomly selecting a first resource and a second resource within one or more resource selection windows, wherein the second resource occurs at least the threshold value after the first resource; and transmitting the data on the first and second resources.

Example 38 includes the method of example 37 or some other example herein, further comprising: identifying the threshold value based on a resource pool configuration or a data priority.

Example 39 includes the method of example 37 or some other example herein, further comprising: transmitting sidelink control information (SCI) that includes an indication of a time gap between the first and second resources, wherein the second resources are later than the first resources by the time gap plus a time gap offset, wherein the time gap offset is based on a resource pool configuration or a data priority.

Example 40 includes the method of example 39 or some other example herein, wherein the SCI further include an indication that the UE randomly selected the first and second resources without performing a resource sensing operation.

Example 41 includes a method comprising: determining a set of resources in a resource selection window; identifying a first subset of the set of resources in the resource selection window, the first subset to include slots corresponding to non-monitored slots with an integer number of periods greater than a predetermined number; identifying a second subset of the set of resource in the resource selection window, wherein the second subset includes slots corresponding to non-monitored slots with an integer number of periods less than or equal to the predetermined number; and generating a candidate resource set that includes the first subset and excludes the second subset.

Example 42 includes the method of example 41 or some other example herein, wherein the predetermined number is one.

Example 43 includes the method of example 41 or some other example herein, further comprising: determining the first subset is smaller than a predetermined threshold; and identifying the second subset to include slots corresponding to non-monitored slots with the integer number of periods less than or equal to the predetermined number based on said determining that the first subset is smaller than the predetermined threshold.

Example 44 includes a method of operating a user equipment (UE), the method comprising: performing a sensing operation for a resource evaluation; selecting, based on the sensing, first resources for transmitting sidelink data; performing, based on the first resources, a partial sensing operation for a resource reevaluation or preemption based on the first resources; determining second resources based on the partial sensing operation; and transmitting sidelink control information (SCI) to reserve the second resources.

Example 45 includes the method of example 44 or some other example herein, wherein if no collision is detected by the partial sensing operation, the second resources are the first resources; else, the second resources include at least one resource different from the first resources.

Example 46 includes the method of example 44 or some other example herein, wherein performing the partial sensing operation comprises: selecting one or more sensing occasions based on the first resources; and sensing the one or more sensing occasions.

Example 47 includes the method of example 46 or some other example herein, wherein the partial sensing operation is a periodic sensing operation, the selected resources include a first resource that is at a slot m_1, and selecting the one or more sensing occasions comprises: selecting a sensing occasion at m_1−k*P_reserve,j, where k is a predetermined integer value and P_reserve,j is a supported resource reservation period for evaluation or resource selection.

Example 48 includes the method of example 47 or some other example herein, wherein the selected resources include a second resource at slot m_2, and selecting the sensing occasions comprises: selecting sensing occasions at m_2−k*P_reserve,j.

Example 49 includes the method of example 46 or some other example herein, wherein the partial sensing operation is a periodic sensing operation, and the method further comprises: determining candidate resources that encompass the first resources; and selecting the sensing occasions based on the candidate resources.

Example 50 includes the method of example 49 or some other example herein, wherein the candidate resources start at slot t_y and selecting the one or more sensing occasions comprises: selecting a sensing occasion that starts at slot t_y−P_reserve,j, where P_reserve,j is a supported resource reservation period for evaluation or resource selection.

Example 51 includes the method of example 46 or some other example herein, wherein the partial sensing operation is a contiguous partial sensing operation, the selected resources include a first resource that is at slot m_1, and selecting the one or more sensing occasions comprises: selecting a sensing occasion that starts at m_1−R, where R is a length of a resource reservation window.

Example 52 includes the method of example 51 or some other example herein, wherein the sensing occasion ends at m_1−T_proc,1, where T_proc,1 is a number of slots required by the UE to prepare sidelink transmissions.

Example 53 includes the method of example 46 or some other example herein, wherein the sensing operation is a periodic partial sensing operation and the method further comprises: determining, based on the periodic partial sensing operation, candidate resources that encompass the first resources and start at slot t_y; and selecting the one or more sensing occasions to include a sensing occasion that starts t_y−R, where R is a length of a resource reservation window.

Example 54 includes the method of example 53 or some other example herein, wherein the sensing occasion ends at m_1−T_proc,1−T_proc,0, where T_proc_0 is a number of slots required by the UE to process sensing results and T_proc,1 is a number of slots required by the UE to prepare sidelink transmissions.

Example 55 includes the method of example 44 or some other example herein, further comprising: selecting the partial sensing operation for resource reevaluation or pre-emption checking based on a type of the sensing operation for the resource evaluation.

Example 56 includes the method of example 44 or some other example herein, wherein: the sensing operation is full sensing, periodic-based partial sensing, contiguous partial sensing, periodic-based partial sensing and contiguous partial sensing, or no sensing; and the partial sensing operation is periodic-based partial sensing, contiguous partial sensing, or periodic-based partial sensing and contiguous partial sensing.

Example 57 may include an apparatus comprising means to perform one or more elements of a method described in or related to any of examples 1-56, or any other method or process described herein.

Example 58 may include one or more non-transitory computer-readable media comprising instructions to cause an electronic device, upon execution of the instructions by one or more processors of the electronic device, to perform one or more elements of a method described in or related to any of examples 1-56, or any other method or process described herein.

Example 59 may include an apparatus comprising logic, modules, or circuitry to perform one or more elements of a method described in or related to any of examples 1-56, or any other method or process described herein.

Example 60 may include a method, technique, or process as described in or related to any of examples 1-56, or portions or parts thereof.

Example 61 may include an apparatus comprising: one or more processors and one or more computer-readable media comprising instructions that, when executed by the one or more processors, cause the one or more processors to perform the method, techniques, or process as described in or related to any of examples 1-56, or portions thereof.

Example 62 may include a signal as described in or related to any of examples 1-56, or portions or parts thereof.

Example 63 may include a datagram, information element, packet, frame, segment, PDU, or message as described in or related to any of examples 1-56, or portions or parts thereof, or otherwise described in the present disclosure.

Example 64 may include a signal encoded with data as described in or related to any of examples 1-56, or portions or parts thereof, or otherwise described in the present disclosure.

Example 65 may include a signal encoded with a datagram, IE, packet, frame, segment, PDU, or message as described in or related to any of examples 1-56, or portions or parts thereof, or otherwise described in the present disclosure.

Example 66 may include an electromagnetic signal carrying computer-readable instructions, wherein execution of the computer-readable instructions by one or more processors is to cause the one or more processors to perform the method, techniques, or process as described in or related to any of examples 1-56, or portions thereof.

Example 67 may include a computer program comprising instructions, wherein execution of the program by a processing element is to cause the processing element to carry out the method, techniques, or process as described in or related to any of examples 1-56, or portions thereof.

Example 68 may include a signal in a wireless network as shown and described herein.

Example 69 may include a method of communicating in a wireless network as shown and described herein.

Example 70 may include a system for providing wireless communication as shown and described herein.

Example 71 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   process configuration information for a resource pool;
   determine a type of traffic to be transmitted, the type of traffic to include periodic traffic;
   determine, based on the configuration information and the type of traffic, first and second values to define a window for contiguous partial sensing, wherein to determine the first and second values includes to:
   determine the first value is t_y−R, where t_y is a candidate slot in a resource selection window and R is a length of a resource reservation window; and
   determine the second value is t_y−T_proc,0 or t_y−T_proc,0−T_proc,1, where T_proc,0 is a number of slots required to process sensing results, and T_proc,1 is a number of slots required to prepare a physical sidelink control channel (PSCCH) or a physical sidelink shared channel (PSSCH) transmission; and perform contiguous partial sensing within the window, wherein to perform contiguous partial sensing within the window includes to monitor all slots within the window.

2. The one or more non-transitory computer-readable media of claim 1, wherein the configuration information includes configured resource reservation periods having both zero and non-zero values.

3. The one or more non-transitory computer-readable media of claim 1, wherein the instructions, when executed, further cause the processing circuitry to:
determine the first and second values based on a remaining packet delay budget of data to be transmitted.

4. The one or more non-transitory computer-readable media of claim 3, wherein the instructions, when executed, further cause the processing circuitry to:
determine the first and second values to provide a time gap between the second value or the first value and the remaining PDB is greater than a preconfigured threshold.

5. The one or more non-transitory computer-readable media of claim 4, wherein the instructions, when executed, further cause the processing circuitry to: determine the preconfigured threshold based on the configuration information.

6. The one or more non-transitory computer-readable media of claim 1, wherein the instructions, when executed, further cause the processing circuitry to:
determine the first and second values based on a priority of data to be transmitted.

7. The one or more non-transitory computer-readable media of claim 1, wherein the instructions, when executed, further cause the processing circuitry to:
perform periodic-based partial sensing; and
select a resource for a transmission, wherein the resource is selected based on the periodic-based partial sensing and the contiguous partial sensing.

8. A method comprising:
processing configuration information for a resource pool;
determining a type of traffic to be transmitted, the type of traffic to include periodic traffic;
determining, based on the configuration information and traffic the type of traffic, first and second values to define a window for contiguous partial sensing, wherein determining the first and second values includes:
determining the first value is $t\_y-R$, where $t\_y$ is a candidate slot in a resource selection window and R is a length of a resource reservation window; and
determining the second value is $t\_y-T\_proc,0$ or $t\_y-T\_proc,0-T\_proc,1$, where $T\_proc,0$ is a number of slots required to process sensing results, and $T\_proc,1$ is a number of slots required to prepare a physical sidelink control channel (PSCCH) or a physical sidelink shared channel (PSSCH) transmission; and
performing contiguous partial sensing within the window, wherein performing contiguous partial sensing includes monitoring all slots within the window.

9. The method of claim 8, wherein the configuration information includes configured resource reservation periods having both zero and non-zero values.

10. The method of claim 8, further comprising:
determining the first and second values based on a remaining packet delay budget of data to be transmitted.

11. The method of claim 10, further comprising:
determining the first and second values to provide a time gap between the second value or the first value and the remaining PDB is greater than a preconfigured threshold.

12. The method of claim 11, further comprising:
determining the preconfigured threshold based on the configuration information.

13. The method of claim 8, further comprising:
determining the first and second values based on a priority of data to be transmitted.

14. The method of claim 8, further comprising:
performing periodic-based partial sensing; and
selecting a resource for a transmission, wherein the resource is selected based on the periodic-based partial sensing and the contiguous partial sensing.

15. A baseband processor comprising:
processing circuitry to:
process configuration information for a resource pool;
determine a type of traffic to be transmitted, the type of traffic to include periodic traffic;
determine, based on the configuration information and the type of traffic, first and second values to define a window for contiguous partial sensing, wherein to determine the first and second values includes to:
determine the first value is $t\_y-R$, where $t\_y$ is a candidate slot in a resource selection window and R is a length of a resource reservation window; and
determine the second value is $t\_y-T\_proc,0$ or $t\_y-T\_proc,0-T\_proc,1$, where $T\_proc,0$ is a number of slots required to process sensing results, and $T\_proc,1$ is a number of slots required to prepare a physical sidelink control channel (PSCCH) or a physical sidelink shared channel (PSSCH) transmission; and
perform contiguous partial sensing within the window, wherein to perform contiguous partial sensing within the window includes to monitor all slots within the window; and
interface circuitry coupled with the processing circuitry to enable communication.

16. The baseband processor of claim 15, wherein the configuration information includes configured resource reservation periods having both zero and non-zero values.

17. The baseband processor of claim 15, wherein the processing circuitry is further to:
determine the first and second values based on a priority of data to be transmitted.

18. The baseband processor of claim 15, wherein the processing circuitry is further to:
perform periodic-based partial sensing; and
select a resource for a transmission, wherein the resource is selected based on the periodic-based partial sensing and the contiguous partial sensing.

\* \* \* \* \*